(12) United States Patent
Jin

(10) Patent No.: US 10,928,792 B2
(45) Date of Patent: Feb. 23, 2021

(54) PARALLEL MANUFACTURING SYSTEMS AND METHODS

(71) Applicant: LERIDGE GLOBAL CORPORATION, Camana Bay (KY)

(72) Inventor: Yong Jin, Beijing (CN)

(73) Assignee: LERIDGE CORPORATION

( * ) Notice: Subject to any disclaimer, the term of this patent is extended or adjusted under 35 U.S.C. 154(b) by 787 days.

(21) Appl. No.: 15/652,860

(22) Filed: Jul. 18, 2017

(65) Prior Publication Data

US 2018/0024518 A1 Jan. 25, 2018

Related U.S. Application Data

(60) Provisional application No. 62/366,252, filed on Jul. 25, 2016.

(51) Int. Cl.

| | |
|---|---|
| *G05B 19/042* | (2006.01) |
| *D05B 75/00* | (2006.01) |
| *D05B 25/00* | (2006.01) |
| *D05B 41/00* | (2006.01) |
| *G05B 19/418* | (2006.01) |
| *G06Q 10/08* | (2012.01) |
| *G06Q 50/04* | (2012.01) |
| *G06Q 10/06* | (2012.01) |

(52) U.S. Cl.
CPC ........... *G05B 19/042* (2013.01); *D05B 25/00* (2013.01); *D05B 41/00* (2013.01); *D05B 75/00* (2013.01); *G05B 19/41845* (2013.01); *G06Q 10/0631* (2013.01); *G06Q 10/087* (2013.01); *G06Q 50/04* (2013.01); *G05B 2219/2626* (2013.01)

(58) Field of Classification Search
CPC ........... G06Q 30/0268; G06Q 30/0238; G06Q 30/0267; G06Q 30/0261; G06Q 50/12
See application file for complete search history.

(56) References Cited

U.S. PATENT DOCUMENTS

| | | | | |
|---|---|---|---|---|
| 2014/0365258 A1* | 12/2014 | Vestal | .............. | G06Q 10/06311 705/7.15 |
| 2020/0192337 A1* | 6/2020 | Hoffman | ............ | G06Q 10/1097 |

* cited by examiner

*Primary Examiner* — John C Hong

(57) ABSTRACT

The invention provides methods, equipment and apparatuses for a highly flexible assembly system. The system may include at least one item of mobile equipment, at least one mobile container and at least one manufacturing management system (MMS). Because it is so flexible, the system may allow for efficient simultaneous processing of multiple dissimilar products. The system may also accommodate manufacturing processes requiring hybrid methods.

8 Claims, 23 Drawing Sheets

US 10,928,792 B2

PARALLEL MANUFACTURING SYSTEMS AND METHODS

CROSS-REFERENCE TO RELATED APPLICATIONS

This application claims priority from U.S. Provisional Patent Application 62/366,252 filed on Jul. 25, 2016, which is hereby incorporated by reference herein in its entirety.

BACKGROUND OF THE INVENTION

Embodiments of the invention relate to equipment, methods, and apparatuses for improving industrial assembly lines. Modern assembly line manufacturing processes are typically highly-automated in terms of operations necessary to manipulate input materials, work-in-progress (WIP) materials and various equipment/devices in order to create a finished end product. Automation is desirable because of its potential to reduce manufacturing costs and to affect the manufacture of products having consistent and predictable quality.

Unfortunately, automation is subject to a number of distinct constraints. These constraints limit ultimate value. First, a number of manufacturing operations cannot be efficiently performed absent without human input. For example, widely varying process conditions require human input. Second, automation is often not cost effective unless the automated process generates an amount of product in such a quantity that savings from economics of scale overcome the costs associated with preparing the manufacturing process in the first place. Thus there is clear utility in novel equipment, methods, and apparatuses for improving industrial assembly lines. The present invention addresses these needs and provides further related advantages.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR § 1.56(a) exists.

BRIEF SUMMARY OF THE INVENTION

To satisfy the long-felt but unsolved needs identified above, at least one embodiment of the invention is directed towards a system for manufacturing. Such a system preferably includes: at least one item of mobile equipment (ME), at least one mobile container (MC), and at least one manufacturing management system (MMS). The MMS is preferably constructed and arranged to allocate the mobile container and the mobile equipment to convert at least one type of input material into at least one end product.

Additional features and advantages are described herein, and will be apparent from, the following Detailed Description.

BRIEF DESCRIPTION OF THE DRAWINGS

A detailed description of the invention is hereafter described with specific reference being made to the drawings in which.

For the purposes of this disclosure, like reference numerals in the figures shall refer to like features unless otherwise indicated. The drawings are only an exemplification of the principles of the invention and are not intended to limit the invention to the particular embodiments illustrated.

DETAILED DESCRIPTION OF THE INVENTION

Definitions

Figure 1:
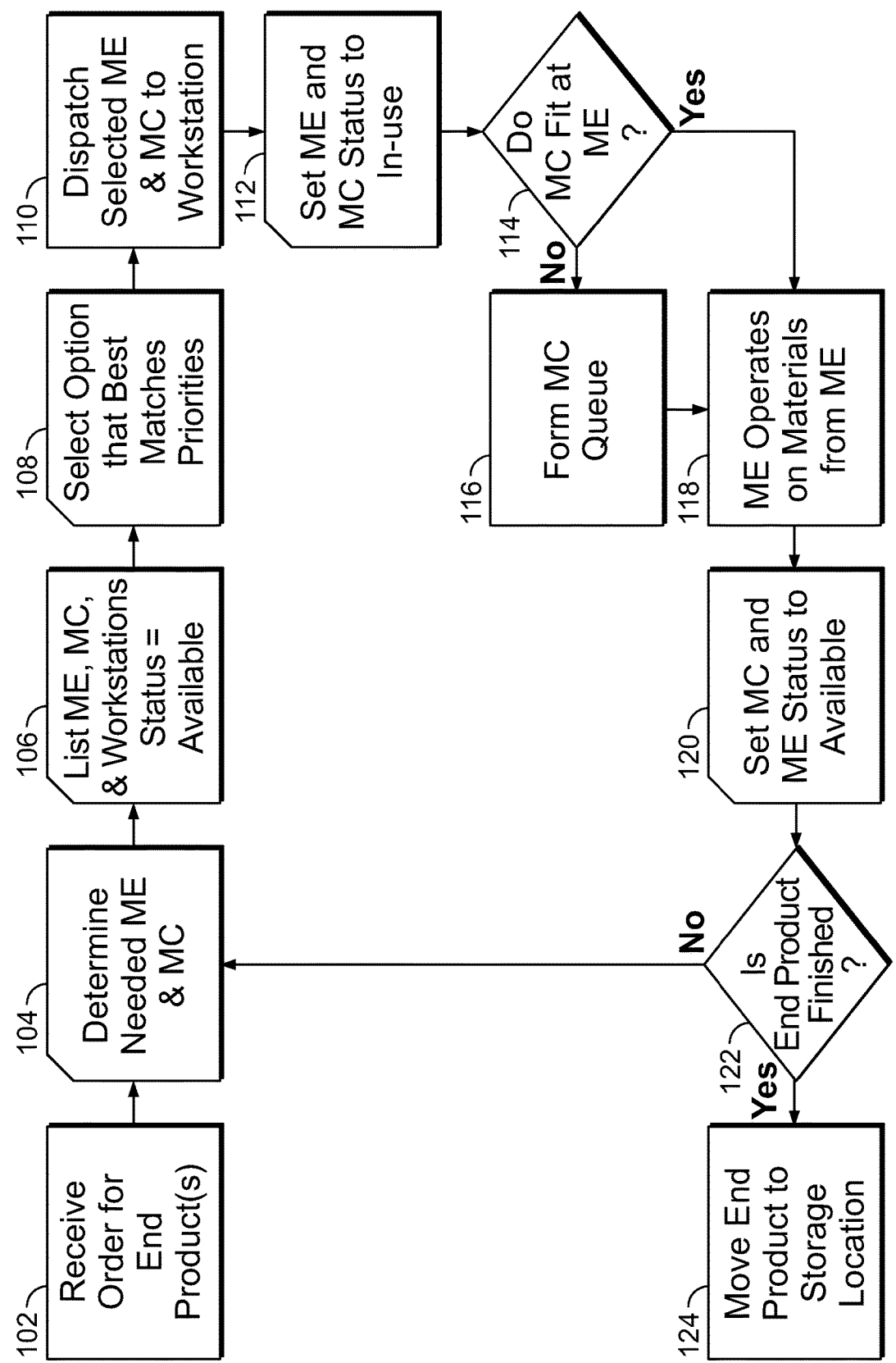
FIG. 1 shown an illustration of an illustrative logic flowchart of MMS guided ME and MC.

The following definitions are provided to determine how terms used in this application, and in particular how the claims, are to be construed. The organization of the definitions is for convenience only and is not intended to limit any of the definitions to any particular category.

"ME or Mobile Equipment" means one or more distinct tools or pieces of equipment designed to perform and/or complete one or more functions, operations, or steps in a manufacturing process and which are constructed and arranged to be readily capable of relocation from one location of a manufacturing site to another with the addition of little or no human labor other than motive force. In some embodiments, mobile equipment may be self-propelled or may be moved by other devices or by workers.

"SE or Stationary Equipment" means one or more distinct tools or pieces of equipment designed to perform and/or complete one or more functions, operations, or steps in a manufacturing process and which are constructed and arranged to be readily capable of relocation from one location of a manufacturing site to another only with the addition of considerable human labor and/or additional efforts.

"MC or Mobile Container" means a container, receptacle, or apparatus capable of holding or storing one or more materials (such as input materials or WIP materials) which are constructed and arranged to be readily capable of relocation from one location of a manufacturing site to another with the addition of little or no human labor. Mobile equipment may be self-propelled or may be moved by other devices or by workers.

"Material" is a broad term encompassing any item of matter which in some way becomes physically incorporated, at least temporarily, into at least a portion of what will ultimately become the finished product or end product of a manufacturing process. The term "material" includes but is not limited to: raw materials, input materials, WIP materials, intermediate materials, defective materials, consumable materials, consumed materials, coatings, substrates, additives, parts, chemicals, and materials or portions thereof which for one reason or another are recycled or reintroduced into the manufacturing process more than one time.

"Input Material" means a material used in a manufacturing process which has not been operated on in response to the inputting into the system of a desired end product. Input material may be a raw material or it may be the end product of an earlier manufacturing process.

"WIP Material" means a work in progress material; a material that has had at least one piece of equipment perform an operation on it in response to a desired end product being input into the system. WIP material may be produced by equipment operating on input material or by further operating on WIP material.

"MMS" means a mobile management system, a data processing system constructed and arranged to store and optionally control the states, operations, allocation, and orientations of at least one or more pieces of mobile equipment. An MMS may comprise: a computer system, a subsystem for managing production processes, a subsystem for optimizing multiple production processes, a subsystem for traffic direction of mobile equipment and containers, a subsystem for tracking the distribution of items within a location or floorplan, an input-WIP-output production inventory system, and/or any combination thereof.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *CIRP Encyclopedia of Production Engineering*, (2014), Published by Springer-Verlag, this definition shall control how the term is to be defined in the claims.

DETAILED EMBODIMENTS

The embodiments described herein are directed to methods and system for providing highly efficient assembly lines, such as for the production, inter alia, of textiles. The assembly lines may efficiently use manpower and robotic mechanism conjunctively. The embodiments preferably take advantage of the distinct attributes associated with human operators and robotic mechanisms, respectively.

A manufacturing system is provided. The manufacturing system may include a location. The location may be referred to herein as a workstation at which to locate one or more pieces of mobile equipment and/or one or more mobile containers. The location may be a fixed position on a floor. The location may also be a position on a floor that varies and/or migrates over time.

The manufacturing system may also include at least one mobile container. The manufacturing system may also include a first mobile machine. The first mobile machine may be an assembly line machine. The manufacturing system may also include a second mobile machine. The second mobile machine may also be an assembly line machine.

The manufacturing system may alternate between states included in a plurality of states. The plurality of states may include a first state, a second state, a third state, a fourth state and/or any other suitable state. In each state, the location, the mobile container, the first mobile machine and the second machine may perform the same or different tasks and/or operate in the same or different manners.

In the first state, the mobile container and the first mobile machine may be situated within a predetermined distance from the location. Also, the second mobile machine may be situated outside the predetermined distance from the location.

In the second state, the first mobile machine may be situated within a predetermined distance from the location. Also, the mobile container and the second mobile machine may be situated outside of the predetermined distance from the location;

In the third state, the first mobile machine and the mobile container may be situated within the predetermined distance from the location. Also, the second mobile machine may be situated outside of the predetermined distance from the location.

In the fourth state, the mobile container and the second mobile machine may be situated within the predetermined distance from the location. Also, the first mobile machine may be situated outside of the predetermined distance from the location.

In order to transition from one state to another state, the mobile container, the first mobile machine and the second mobile machine may travel, within predetermined boundaries, using robotic mechanisms. The robotic mechanisms may be directed by a manufacturing management system (MMS). The MMS may oversee and/or direct a plurality of locations and/or workstations included on a floor. The locations and/or workstations may be included on a floor grid. At least some of the locations and/or workstations may be locations outside the predetermined distance from a single, predetermined, location.

The MMS may include process logic. The process logic may be configured to manage the operation of at least the mobile container, the first mobile machine and the second mobile machine included at each location and/or workstation. The process logic may take into account various capabilities, such as speed, flexibility, position, remaining battery power and availability of each of the components, such as the mobile container, robots associated with each mobile container and each of the workstations directed by the MMS. The MMS may use one or more optimization algorithms to utilize the capabilities of both the components and the workstations in a process that avoids bottlenecks and idle time at any specific component and/or workstation. The MMS may be configured to alternate the system between the states, included in the plurality of states, according to a specific manufacturing scheme.

During transition between two states, the mobile container and the mobile machine that is situated within the predetermined distance from the location may be in contact with the floor. Therefore, the mobile container and the mobile machine may have a higher frictional coefficient with the floor than do other mobile containers and/or other mobile machines that may be situated outside of the predetermined distance from the location.

In some embodiments, the manufacturing system may include a container, two machine platforms and two support robots. It should be appreciated that more containers, machine platforms and support robots may be included in the scope of this disclosure.

The container may include a storage area. The storage area may be supported by at least two column ends. The column ends may hold the storage area off the ground. At least one of the support robots may be sized to fit between column ends of the storage area. The support robot may also be constructed and arranged to lift and/or transport the storage area.

The machine platform may include a machine device. The machine device may be supported by at least two column ends. The column ends may hold the machine device off the ground. At least one of the support robots may be sized to fit between the column ends of the machine platform. The support robot may also be constructed and arranged to lift and/or transport the machine platform.

In some embodiments, the machine device may be a sewing machine. In these embodiments, the container may be configured to store a plurality of textile items. The textile items may include raw materials, works in progress and/or finished products.

The support robots may transport the container and/or the machine platform according to a manufacturing scheme. The manufacturing scheme may include moving a work in progress alternatively between at least one container and a plurality of machine platforms.

In some embodiments, a support robot may be configured to releasably attach to the container and/or one or more of the machine platforms. In the same or other embodiments, a support robot may include a charge adaptor. The charge adaptor may be configured to engage with a charging station. The engaging with a charging station may occur while the robot is engaged to a container. The engaging with a charging station may occur while the robot is engaged to a machine platform.

In some embodiments, the container and the machine platforms may have an overall horizontal profile. The horizontal profile may be configured to enable the superstructure of the container to become positioned with no greater a proximity to the superstructure of the machine platform than a predetermined distance. The predetermined distance may be 1 meter, 2 meters, 3 meters, 10 meters, 30 meters or any other suitable distance.

A method of manufacturing may be provided. The method may include transporting a plurality of mobile apparatuses between a plurality of locations. The plurality of mobile apparatuses may include a plurality of mobile containers and/or a plurality of mobile machines. The plurality of mobile machines may include mobile sewing machines.

The method may include shifting a plurality of materials from the plurality of mobile containers to the plurality of mobile machines. The shifting may occur when the mobile containers and the mobile machines are in proximity to the same location.

The method may also include operating on a portion of material. The portion of material may be included in the plurality of materials. The portion of material may be operated on by at least one of the mobile machines.

The method may also include moving and/or transporting a mobile container away from a mobile machine. The moving may occur during at least a portion of the time that the material is operated on by the mobile machine.

The method may also include moving and/or transporting the portion of material from the mobile machine to a mobile container. The moving may occur after the portion of material has been operated on. The transporting of the mobile apparatuses may be controlled by a manufacturing management system.

The method may include progressively converting the portion of material into a finished product. The conversion may occur after the portion of material has been operated on successively by one or more mobile machines. In some embodiments, the conversion may occur after the portion of material has been operated on successively by two mobile machines.

At least one embodiment of the invention is directed towards a manufacturing system and/or a method of using such a system. The system may include at least one item of mobile equipment, at least one mobile container, and at least one MMS. The system makes use of the MMS to manage the operations of the equipment and containers on the materials to produce an end product. Optionally, the system further comprises one or more pieces of stationary equipment and/or stationary containers.

Information present on the MMS may include the location, state, and contents of the: mobile equipment, mobile container, and (if applicable) stationary equipment and containers. Present information also preferably includes an identification of a specific end product, a list of which materials and equipment are required to produce the specific end product, and a tally of how many end products are to be produced.

The associated states are descriptors of the real world condition of the specific equipment or container. They include but are not limited to one, some, or all of: in-use (and/or if it has multiple uses, the type of use), operation completed, assigned, unassigned, available, unavailable, time until available and time it will be assigned. The MMS may also be capable of measuring, receiving measurements, or otherwise determining the states of the specific equipment or container as its state changes.

In at least one embodiment, a desired end product's identity, description and/or quantity may be input into the MMS. In one embodiment, a desired end product's identity, description and/or quantity may preferably be input into the MMS in the form of a digital file. It may also be input in the form of a received order.

The MMS may then access information regarding the identified product. Such information may include one or more of the following: the various materials that need to be used, the various equipment that should preferably perform operations on the material, the specific sequence according to which the material and equipment should preferably be applied and the various possible locations where the containers and equipment may be positioned to enable the sequence to occur. The system may then instruct the mobile equipment and mobile containers to position themselves and interact according to the accessed information such that the end product may be produced. The end product's identity may be in the form of a serial number, a bar code, a magnetic strip, a user-friendly word or term, a radio-frequency code, or any other data, syntax, or other descriptor, which is indexed to the information to be accessed regarding the identified product. The accessed information may be predetermined or may be dynamically generated based on other attributes of the order, the facility's attributes, or other factors. The accessed information may reside in the MMS or may be accessed from an external source (for example, but not limited to an internet or other external data access protocol).

The amount of materials within a container may be determined through the use of one or more of: scales, optical sensors, pressure sensors, chemical detection, fluorescence, or inventory software which keeps track of when material is added to a container as well as when it is used in manufacturing or is otherwise removed from the container and/or any additional methods or equipment known in the art which is constructed and arranged to transmit the quantity of material present to the MMS.

In at least one embodiment, the information system includes process logic allowing it to make decisions based on predetermined priorities. For example, if the manufacturing process involves a rate limiting step—i.e., a step which take more time than others and creates bottlenecks —, based on the priorities of the user the system can decide to: allocate multiple pieces of the rate limiting equipment to increase production speed through parallel processing and/or to slow down the rate of operation of the faster equipment to reduce wear and tear on equipment. Similarly, it may position the equipment and containers in a configuration that: leaves room for additional manufacturing processes to occur, maximizes production speed by reducing distances between containers and or equipment and/or address some other criteria such as safety, density, or ventilation. The priorities may also be to reduce bottlenecks, maintain line balance, coordinate worker breaks and avoid risk loss.

In some cases, the production process may require the use of stationary equipment and/or stationary containers. The positioning of the mobile equipment and/or mobile containers may utilize the proximity of the stationary equipment or containers. There may be various reasons why equipment may be stationary. These reasons may include, but are not limited to, the equipment being massive, delicate, dangerous, or expensive. These reasons may also include the stationary equipment requiring close proximity to a material purge or evacuation device, ventilation, power, mounting, support, and/or specific resources. Similarly, containers may be stationary due to the geometric constraints required to load or unload them. For example, containers may need to be adjacent to a truck, ship, rail, or airplane loading dock. Containers may also be stationary because of the size, weight, or packaging of received input materials. Upon being unloaded or unpacked the input materials may be handled by mobile containers.

In at least one embodiment, the mobility of the ME or MC is accomplished by the presence of a self-propelled motor, a human-guided motor, or wheels, skids, rails, impellor, magnets, or other mechanisms that allow a truck, fork lift, other mechanism, or person to move the equipment or container. The mobility may be effected by a robot automatically responding to a location coordinate transmitted by the information system or may be displayed to a human who operates the mobility mechanism. In at least one embodiment, the mobile equipment or container may be powered at least in part by a rechargeable battery. When not assigned to a manufacturing process, the information system may direct the mobile equipment or mobile container to a location where it can recharge its battery and remain available when needed.

In at least one embodiment, the system may include one or more discrete workstations. A workstation may be a predesignated location for one or more MEs or MCs at which to locate. The workstation may be an artifact of the requirement for a power coupling, the presence of water, coolant, thread, or some other material feed, or simply the desire for the locations to be organized according to a particular arrangement or to address a safety or other concern. Stationary equipment or containers may also define one or more workstations.

In at least one embodiment, the system may be constructed and arranged to receive more than one type of end product input. Each end product input may require a different sequence of mobile containers and/or mobile equipment. When receiving more than one end product input, the information system determines the availability of containers, materials, and equipment and positions them according to desired priority criteria. In some cases, the two or more end products may share some early sequence of materials or equipment but then diverge at a later step. The priority criteria may mandate forming a single early production line which then splits into two or more distinct lines as the manufacturing requirements diverge. Similarly, if the different products require the use of particular equipment or materials at different points in the manufacturing sequence, the priority criteria may mandate the shuttling back and forth of equipment or materials between different production lines as appropriate.

The inventive system is applicable to any and all known manufacturing processes. Representative examples of equipment suitable for use with this invention include but are not limited to machines such as: weaving machines, sewing machines, looms, cotton gins, knitting machines, tufting machines, fabric cutters, fabric rollers, dyers, painters, pressing machines, torches, welders, dyes, stamps, bending machines, engravers, papermaking equipment, food manufacturing, packaging, electronic parts and devices, and motor part assembly.

Mobile containers may perform various functions. In some embodiments, the mobile containers hold one or more pieces of material which can be accessed and/or retrieved by a human operator. In some embodiments, the mobile containers may hold one or more pieces of material as the equipment operates on them, or prior thereto. In this manner, they may operate effectively as a conveyer belt, holding one or more pieces of material and shuttling material between equipment.

In some embodiments, the mobile containers may transfer material to or from the mobile equipment. In other embodiments, the mobile equipment itself transfers the material to and from the containers. Such transfers may be accomplished with devices including but not limited to bins, funnels, gravity feeds, pumps, robotic arms, and the like. Mobile containers may be as simple as buckets, baskets, bins, cases, racks, chests, and the like, and/or may include tines, arms, grips, magnets, locks, fasteners, or any known gripping, lifting, holding, or positioning devices known in the art.

In at least one embodiment, a piece of equipment may require material from more than one mobile container. If such materials cannot be fed simultaneously (because of process constraints or simply because the containers block each other's access to the equipment), the MMS may assign each of the containers to a position in a queue to order their delivery. If need be, the containers will cycle repeatedly into, and through, the queue to provide proper material allocations.

The inventive manufacturing system is highly flexible and therefore allows for cost-effective manufacturing of product orders that prior art systems cannot perform. As a consequence, it produces a number of truly unexpected results. For example, in a traditional manufacturing process, equipment and containers are rigidly positioned in a sequence dedicated to the manufacture of a single end product. Changes in desired end product require lengthy and cumbersome changes in position and orientation of equipment and containers. In contrast, because the inventive system uses mobile containers and equipment, changes in sequence are readily accomplished.

In fact, the inventive system changes the fundamental economics of manufacturing. Traditional manufacturing requires mass production of identical end products according to identical methods and relies on economics of scale for cost efficiencies. In contrast, the inventive method requires knowledge of possible permutations of available resources at the time the order is received and relies on efficient allocation of those resources. As a result, the method supports the economic production of non-identical products it uses industry but not necessarily mass production.

The inventive method may also allow for the economic performance of hybrid manufacturing. Hybrid manufacturing is a process which is partially automated and is partially human performed. The human performed steps are typically for those stages in which the material undergoes highly random and unpredictable changes that cannot be easily predicted and therefore cannot be practically automated. For example, in textiles, because fabric can bend and fold into an almost unlimited variety of configurations, it has proven to be exceedingly difficult to automate the loading of such fabric into sewing machines. As a result, textile processes should preferably be hybridized.

In at least one embodiment, the MMS includes information regarding the availability, location, and/or time requirements of human operators operating equipment and/or containers in the manufacturing system. The human operators may move together with mobile equipment and/or mobile containers and/or may be stationed at stationary equipment and/or stationary containers. The MMS may even draw upon information related to specific workers capabilities including employment and human resources records when calculating prime configurations.

FIG. 1 shows an illustrative flow diagram. An MMS may receive an order for a specific end product, as shown at 102. The MMS may then determine the MEs and/or MCs required for the order, as shown at 104. The MMS may then create and/or generate a list of MEs, MCs and workstations that are available, as shown at 106. The MMS may then select an option that best matches priorities of the received order, as shown at 108. The MMS may dispatch the selected ME and MC to the selected workstation, as shown at 110.

The MMS may set a status tag associated with the selected ME and MC to in-use, as shown at 112. A decision step may be shown at 114, whether the selected one or more MCs fit at the selected ME. If the answer to the decision is no, the process proceeds to step 116. Step 116 shows forming an MC queue. An MC queue may be used at an ME when more than one MC is being used in conjunction with a single ME. If the answer to the decision is yes, the process proceeds to step 118. Step 118 shows the ME may operate on materials from the MC.

Upon completion of the operation on the materials, the MC and ME status may be set to available, as shown at 120. The process may then proceed to decision step 122. Decision step 122 may include the query—is the end product finished. If the answer to the query is no, the process may loop back to step 104—determining needed MEs and MCs. If the answer to the query is yes—the process may proceed to step 124. Step 124 may include completion of the process. Step 124 may include moving the end product to a storage location.

Figure 2:
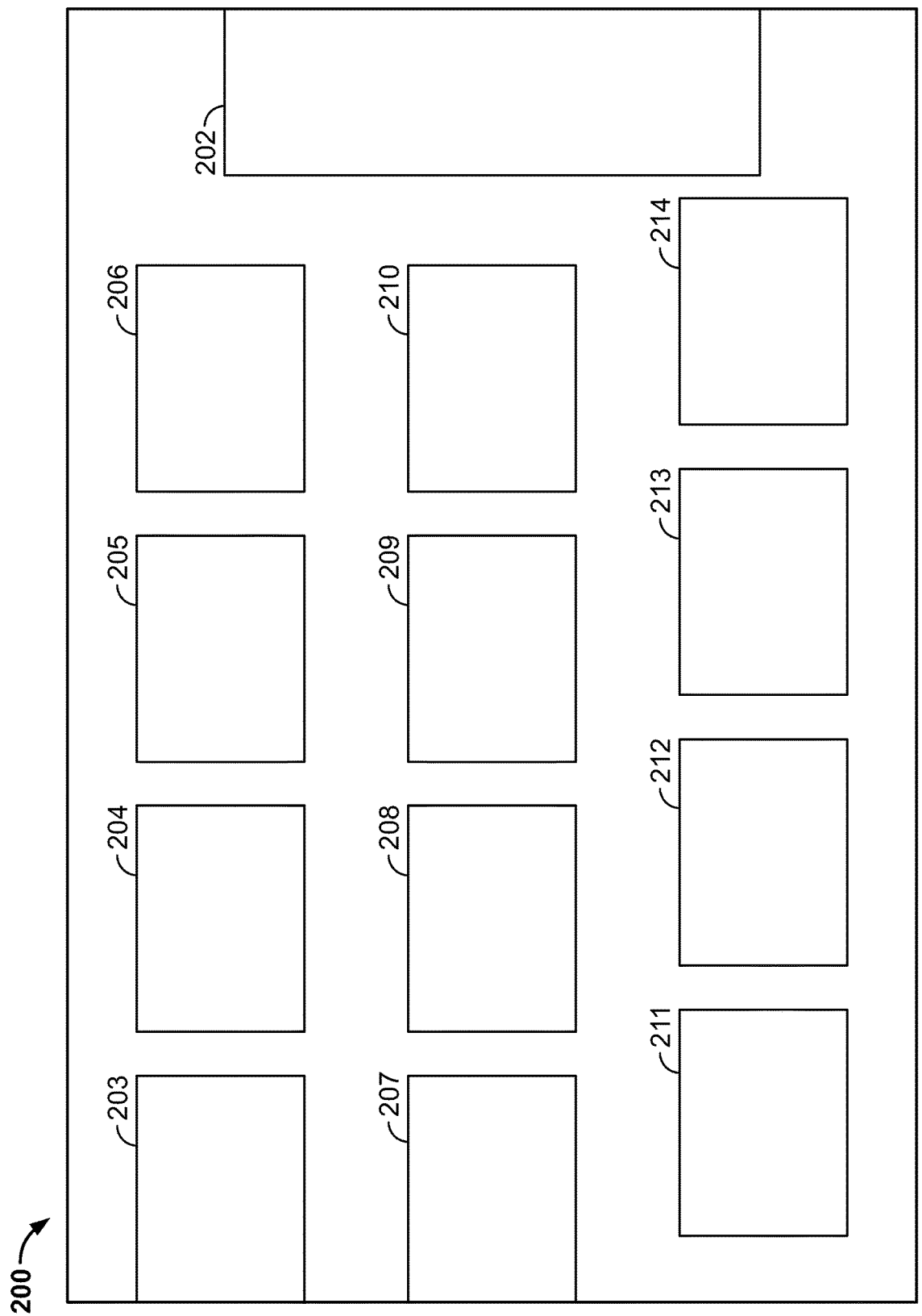
FIG. 2 shown an illustrative overhead illustration of a manufacturing facility utilizing an MMS.

FIG. 2 shows an exemplary orientation of an MMS using industrial facility 200 and its corresponding accoutrements, labeled 202-214. The MMS may allocate mobile and/or stationary equipment, mobile containers, and workstations 203-210 in facility 200 to position the mobile equipment and the mobile containers according to a designated sequence. The mobile equipment may initially start out in an ME holding bay 211 and the mobile containers may initially start out in an MC holding bay 202. Following receipt of an instruction from the MMS, each ME may move to its assigned mobile workspace. A workspace may be referred to herein, in the alternative as a workstation. At its assigned mobile workspace, each ME may couple to an electric power for charging and equipment operation.

Stationary equipment may be required for selected orders. The stationary equipment may occupy certain workstations, such as workstation 206 or workstation 210. The MMS may assign a workstation, which may possess stationary equipment, to an order that requires stationary equipment.

Upon receipt of an order, the MMS may allocate and assign the required number of Mobile Containers and instruct the MCs to move to input dock 212, 213 or 214. Input docks 212, 213 and 214 may be for loading input materials. The MCs may operate in a parallel manner. Input docks 212, 213 and 214 may contain raw materials, WIP materials or any other materials. Upon completion of loading each MC, input docks 212, 213 and 214 may transmit a completion signal to the MMS. In some embodiments, the completion signal may be transmitted upon completion of at least one loading of an MC. In other embodiments, the completion signal may be transmitted upon completion of loading of more than one MC. In yet other embodiments, the completion signal may be transmitted upon completion of all of the MCs.

The MMS may instruct each of the loaded MCs to move to an assigned input slot. Each assigned input slot may be associated with a workspace, such as workspace 203-210. At times, the loaded MC may be instructed, by the MMS, to move to an input slot that is occupied. In such a scenario, the MC may enter into an input queue associated with the assigned occupied input slot. An input queue may be a lineup of MCs that are waiting to be operated on by an occupied workspace.

Each workspace may include an input queue. The MMS may maintain the positions of each MC included in each input queue.

Preferably, all MCs for each process step and its Mobile Equipment are kept at the same location of their respective queues, thus, all of them reach to the front of their queues at the same time, and their corresponding step can be processes with correct input materials and equipment.

Some processes and/or mobile equipment may require human operation and/or one or more physical human operators. A human operator may be situated at a workspace, such as workspace 203-210. Upon arrival of the required MEs and/or MCs at the workspace, the MMS may transmit a "go" signal to the one or more physical human operators situated at the workspace. The "go" signal may direct the one or more operators to begin a designated task. In some embodiments, the "go" signal may be received when an MC moves from a location within an input queue to a production location—i.e., a location, within a workspace, that is used to work on the contents of the MC.

A process unit, which may occur at each workspace, may include receiving input materials via one or more inputs MCs, processing the input materials through one or more MEs, producing output and transferring the output into assigned output MCs. The one or more input MCs may be set to an MC completion state when the input materials of each input MC have been transferred to the one more MEs, thereby completely, or substantially completely, emptying the one or more input MCs. The MC completion state may be set by a human operator located at the workspace. The MC completion state may be set by a sensor attached to the MC.

Upon setting the MC completion state, the MC completion state information may be transmitted to the MMS. Upon receipt of the MC completion state information, the MMS may update the availability status of the transmitting MC (the transmitting MC is currently available). The MMS may assign the newly available MC another task. This process unit may be performed repeatedly for all WIP materials until the end product may be produced and stored in its final location.

An order completion state may be set when all tasks, or substantially all tasks, associated with an order, have been completed—i.e., all input materials for a specific order have been transformed into end products. In some embodiments, the MMS may determine completion of a specific order. In other embodiments, a human operator may determine completion of a specific order. In the embodiments that involve a human operator, upon determination of the order completion, the human operator may transmit an order completion notification to the MMS.

Upon determination of the order completion or upon receipt of the order completion notification, the MMS may utilize available MCs to transport the end products to loading dock 202. Loading dock 202 may package and/or load the end products for off-site shipment. Also upon determination of the order completion or upon receipt of the order completion notification, the MMS may update the availability status of the MEs and/or the MCs involved with the completed order (the MEs and/or the MCs are currently available). The MEs and/or MCs may be available to receive additional tasks from the MMS.

Figure 3:
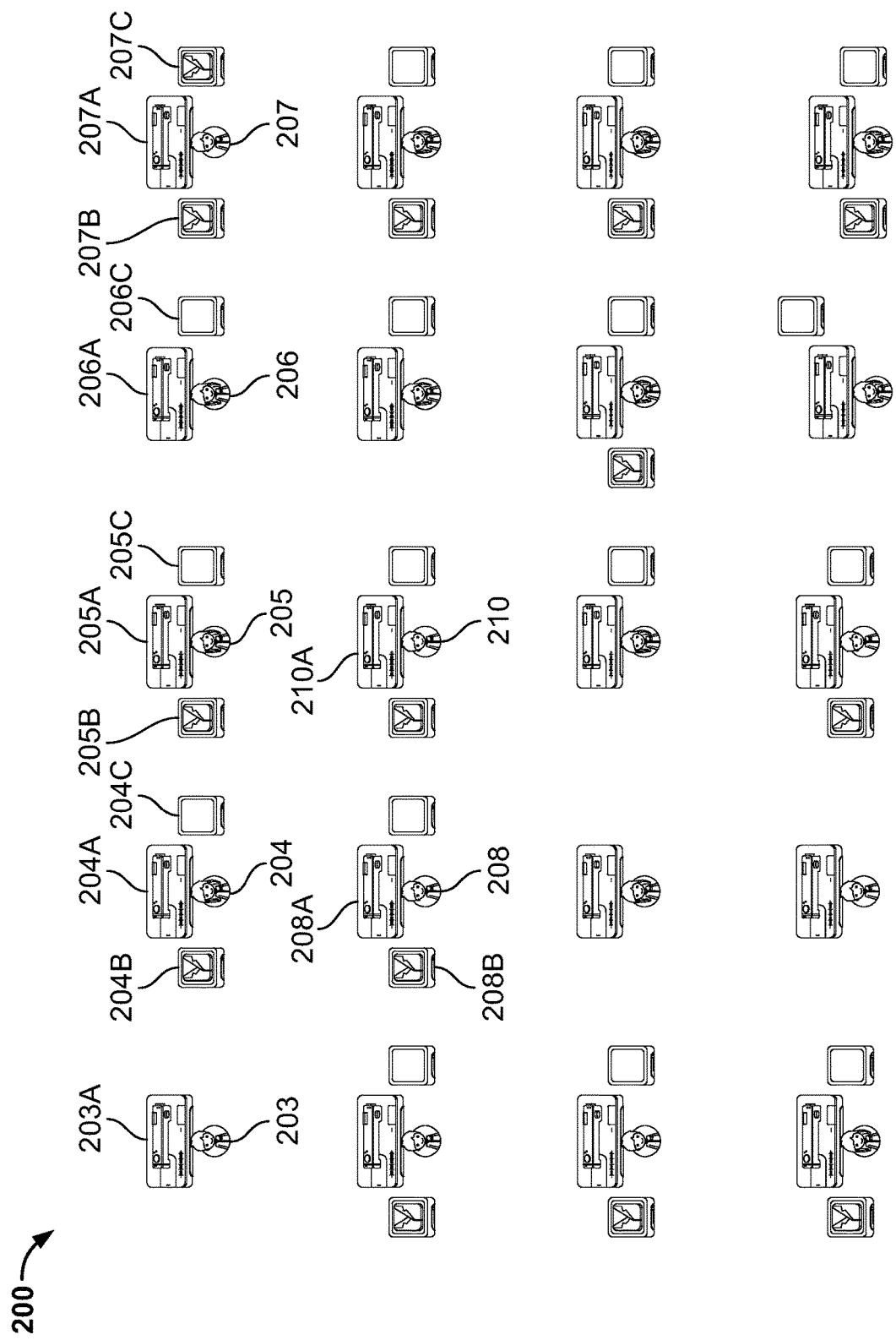
FIG. 3 shows an illustrative first overhead illustration of a manufacturing facility utilizing an MMS with shared ME and MC.

FIGS. 3-6 illustrate some of the hive of activity that may occur in facility 200 utilizing various embodiments. FIG. 3 illustrates an embodiment of facility 200 comprising multiple workspaces. Workspaces 203-208 and 210 may include human operators. Upon completion of a predetermined time interval, at least one ME, such as ME 203A, ME 204A, ME 205A, ME 206A, ME 207A, ME 208A and ME 210A, and/or at least one MC bearing material, such as 204B, 205B, 207B and 208B, may move towards one or more workspaces. The materials, included in 204B, 205B, 207B or 208B may be transferred from the holding MC to the ME.

When work by the specific ME is completed, the materials may be transferred to an empty MC, such as 204C, 205C and 206C for further processing.

Figure 4:
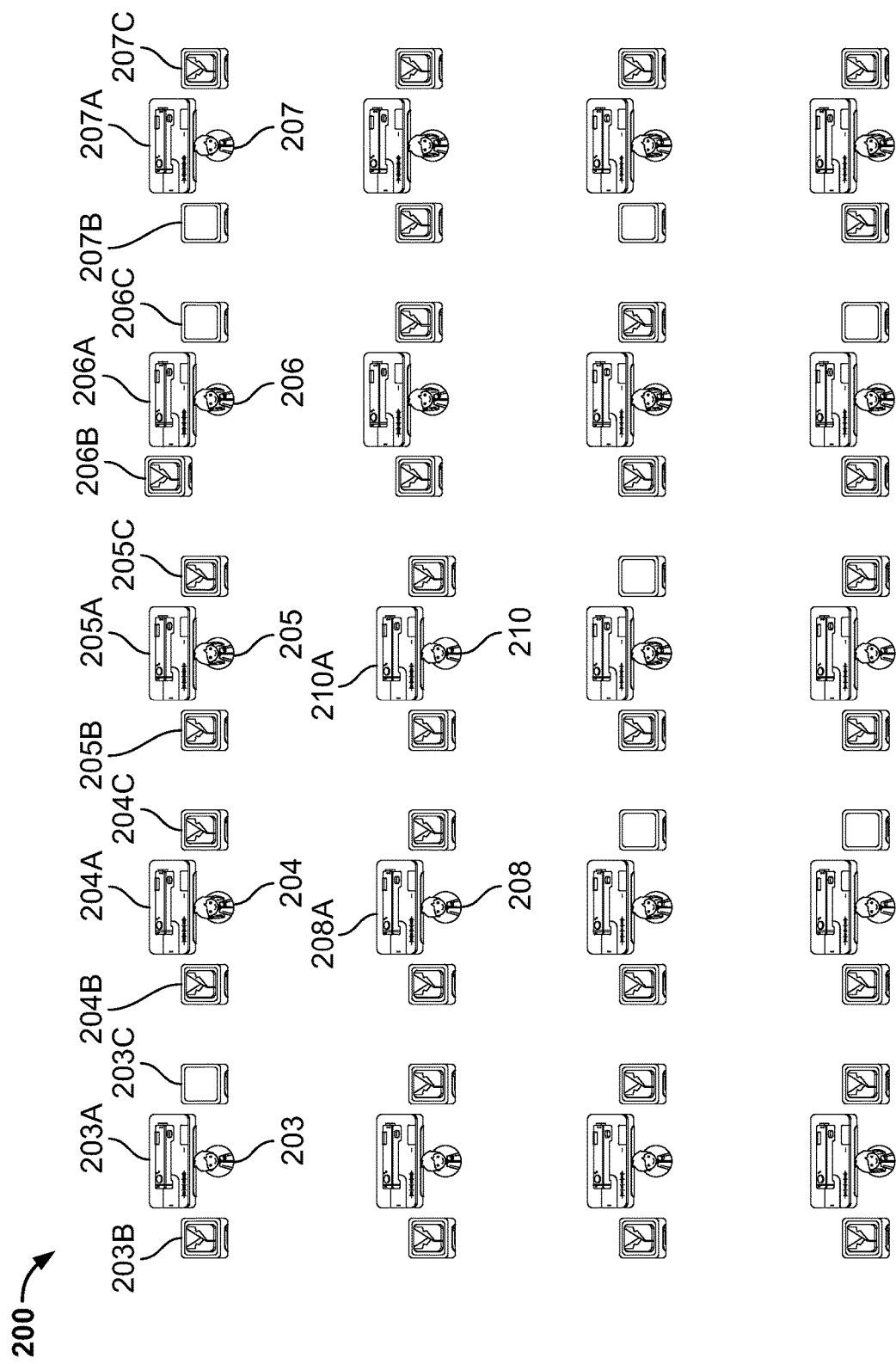
FIG. 4 shows an illustrative second overhead illustration of a manufacturing facility utilizing an MMS with shared ME and MC.

FIG. 4 illustrates numerous activities that may occur subsequent to the illustrative facility 200 snapshot shown in FIG. 3. MC 203B, bearing WIP material, may have moved adjacent to a ME 203A in order for the contents of MC 203B to be processed by ME 203A. MC 203C may also have moved adjacent to ME 203A in order to receive the WIP material after ME 203A has finished operating a process unit on the WIP material. Simultaneously, MC 206B, bearing WIP material, has moved closer to ME 206A. Close viewing of FIG. 4 will reveal numerous other redistributions of various machines and containers throughout facility 200.

Figure 5:
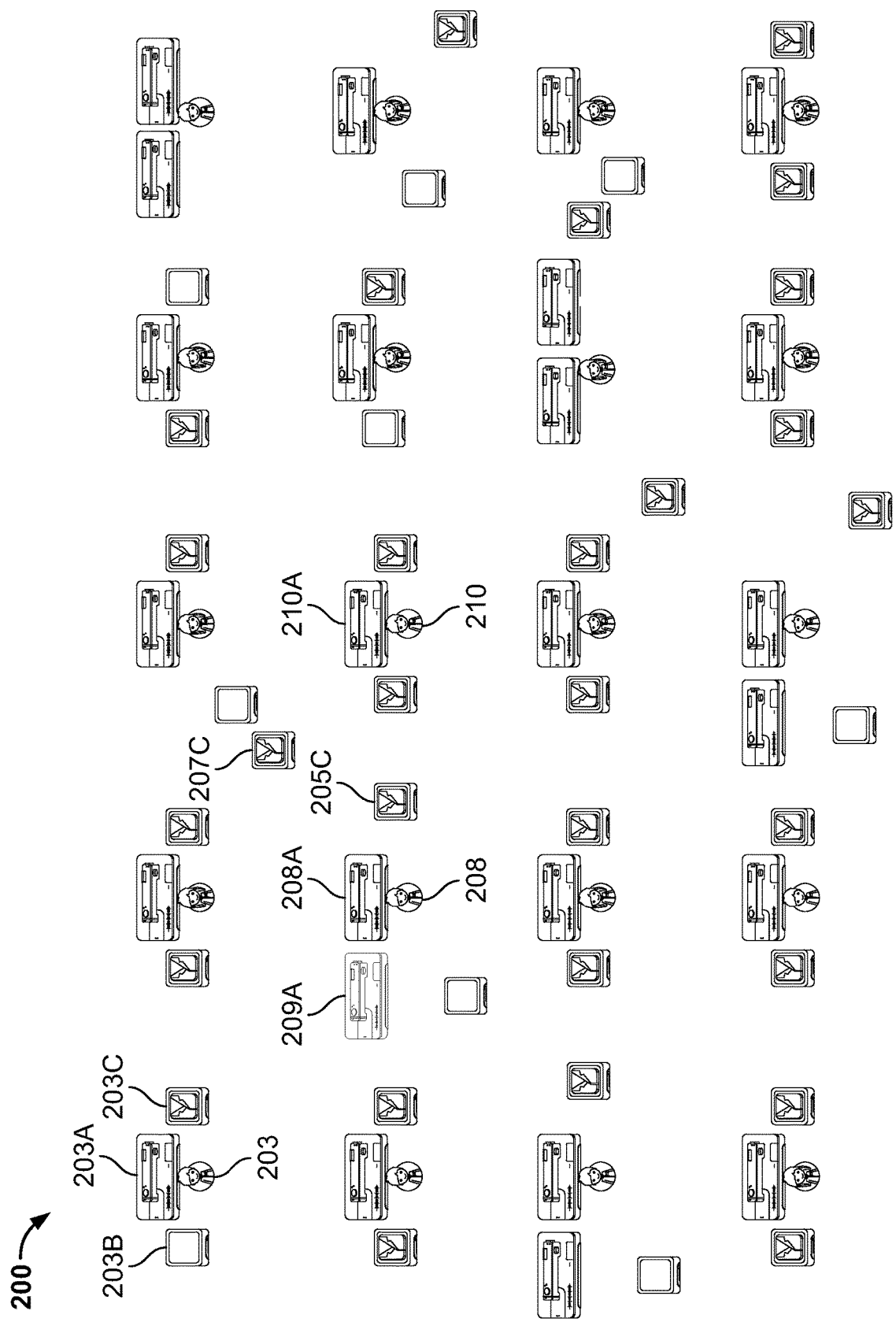
FIG. 5 shows an illustrative third overhead illustration of a manufacturing facility utilizing an MMS with shared ME and MC.

FIG. 5 illustrates numerous activities that may occur subsequent to the illustrative facility 200 snapshot shown in FIG. 4. Among the activities illustrated in FIG. 5, MC 207C may be holding material that has completed a process unit at ME 207A. MC 207C may be currently moving towards ME 210A to complete a subsequent process unit. Simultaneously, ME 208A, which had previously been used at workspace 208, is currently moving away from workspace 208 in order to accommodate ME 209A, which is moving into workspace 208. Also, simultaneously, material worked on by a ME 203A has been moved into MC 203C for transport elsewhere.

Figure 6:
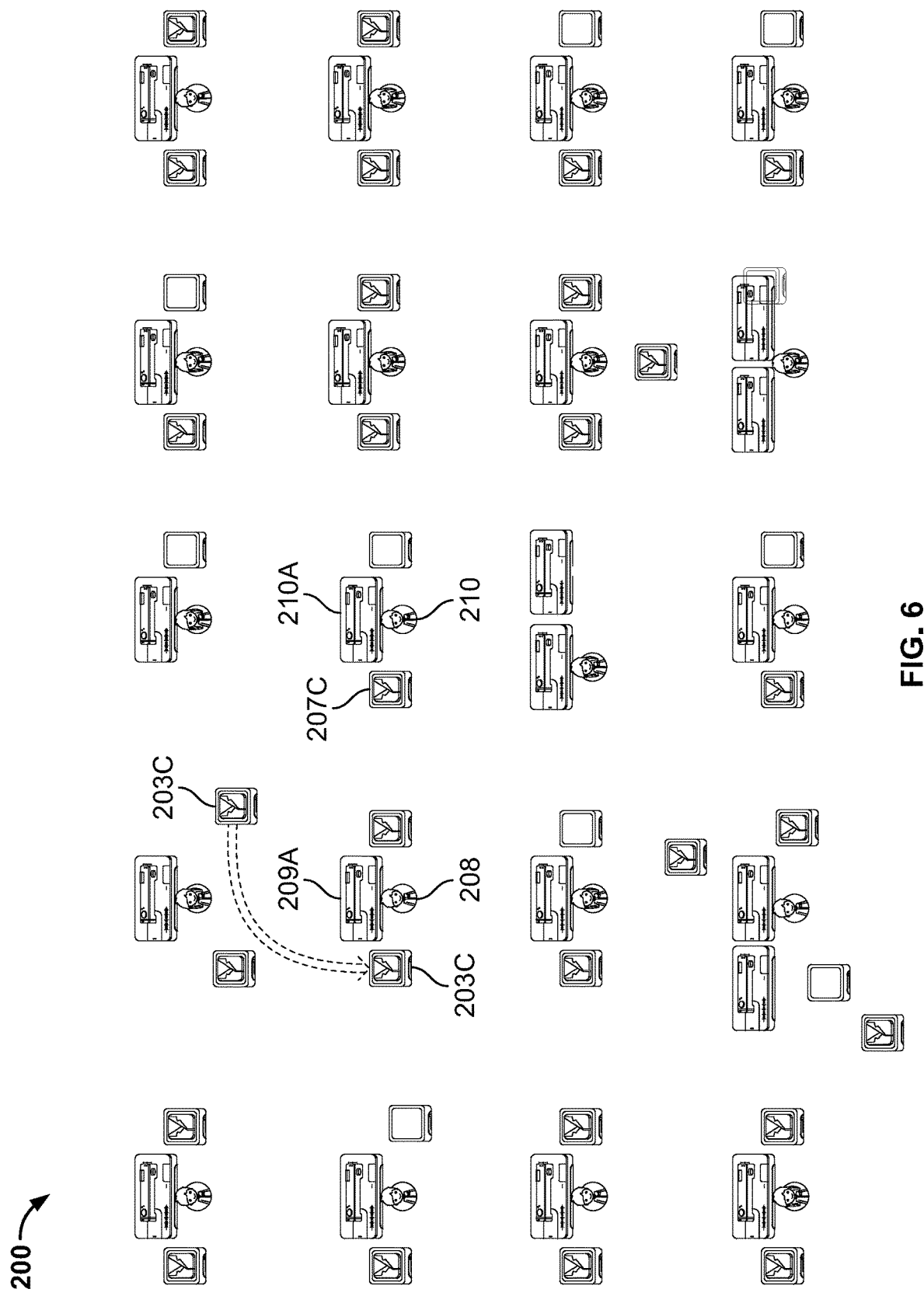
FIG. 6 shows an illustrative fourth overhead illustration of a manufacturing facility utilizing an MMS with shared ME and MC.

FIG. 6 illustrates numerous activities that may occur subsequent to the illustrative facility 200 snapshot shown in FIG. 5. Among the activities illustrated in FIG. 6, MC 203C and ME 209A may have been coordinated, by the MMS, to arrive substantially simultaneously at workspace 208 and may be ready to further process the material included in MC 203C. Simultaneously MC 207C may have been transferred from workstation 207 to workstation 210 for further processing.

Although FIGS. 3-6 illustrate workstations 203-208 and 210 being arranged according to a grid-shaped matrix, it should be appreciated that workstations 203-208 and 210 may also be arranged according to other-shaped matrices, such as, lines, coils, spirals, squares, triangles, trapezoids, random distributions or any combination thereof. Facility 200 may include fixed point reference markers. The fixed point reference markers clarify the relative positions of the MEs and/or the MCs within facility 200.

The locations of the mobile equipment, mobile containers and/or workstations within facility 200 may be determined at any moment through the use of various positioning mechanisms. The positioning mechanisms may be located on some or all of the MEs, MCs and/or workstations. The positioning mechanisms may be located elsewhere in facility 200. The positioning mechanisms may utilize radio-frequency identification (RFID) transmitters, global positioning systems ("GPS"), readable tags or transponders (such as a graphic code, RFID code, and the like), optical sensors, bar code scanners, RFID scanners, signal emissions, laser sensors, a combination thereof and/or any additional methods or equipment known in the art which may be constructed and/or arranged to transmit the location of the MEs, MCs and/or workstations to the MIMS.

FIGS. 7-10 illustrate examples of mobile equipment and/or mobile containers. In FIGS. 7-10, drive mechanism 706 may be constructed and/or arranged to provide motive force to propel the attached mobile equipment and/or mobile containers through facility 200. Drive mechanism 706 may be a robot slaved to an MMS system and/or a self-propelled motor. Drive mechanism 706 may be constructed and/or arranged to engage and/or disengage from a particular ME or MC and reengage with another ME or MC. This may be done for any suitable reason including but not limited to efficient allocation of drive mechanism—e.g., when a facility does not have enough drive mechanisms for all the mobile equipment and mobile containers—, balancing drive mechanisms of various power capabilities with mobile containers holding various size loads, swapping out malfunctioning or low-powered drive mechanisms with "ready to go" mechanisms or any combination thereof. Drive mechanism 706 may move the mobile equipment or mobile containers by lifting an otherwise stationary item off the ground. Drive mechanism 706 may also move the mobile equipment or mobile containers by pushing a leg ending in a wheel, skid, rail, magnet, levitating, impelled, or otherwise slide-able item, such as leg-end 804, or by any other suitable means known in the art.

Figure 7:
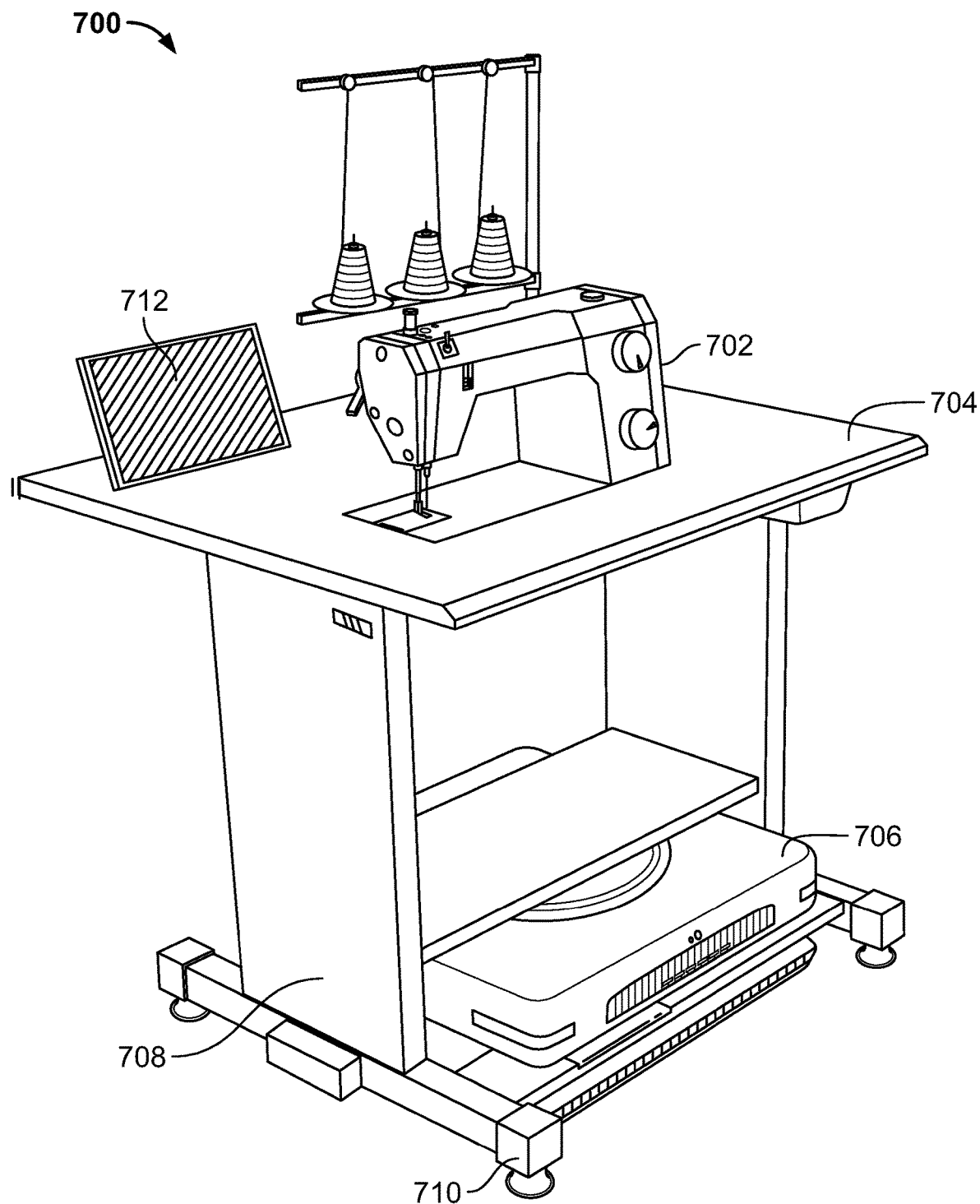
FIG. 7 shows an illustrative perspective view illustration of an ME.

FIG. 7 illustrates mobile equipment 700. Mobile equipment 700 may be similar to ME 203A, shown in FIGS. 3-6. ME 700 may include a machine tool 702. Machine tool 702 may be a sewing machine. ME 700 may also include work surface 704. Work surface 704 may be used to load and unload materials. Work surface 704 may also be used to feed materials into machine tool 702, remove materials from machine tool 702 or otherwise enable a human operator to handle materials located at the workstation. ME 700 may further comprise a workscreen 712 or other data delivery device. Workscreen 712 may provide the human operator with specific information about how to use machine tool 702 to successfully perform a specific process unit, step or portion thereof. As a result, while working on a series of materials, a human operator may use machine tool 702 to perform different activities on each piece of material without distraction. An expected end product may be produced upon successful completion of the specific process unit or step.

ME 700 may also comprise one or more legs 708. One or more legs 708 may support machine tool 702. One or more legs 708 may be vertically and/or horizontally adjustable. The height of machine tool 702 may be vertically adjusted using adjustable legs 708 in order to accommodate a suitable height for various human operators. ME 700 may also comprise frictional surface 710. In certain embodiments, frictional surface 710 may impair movement of ME 700 when ME 700 is not transitioning between locations in facility 200. In other embodiments, frictional surface 710 may slow movement in transition periods.

In at least one embodiment, mobile equipment 700 or mobile containers 800, 900 and 1000 (shown in FIGS. 8, 9 and 10) may include four table-style legs 802, and drive mechanism 706 is configured to removably nestle within the four legs. In an embodiment, drive mechanism 706 possesses a rechargeable power supply and is configured to engage an adaptor of an external power source in order recharge the rechargeable power supply. The recharge process may or may not occur while drive mechanism 706 is engaged to ME 700 or MCs 800, 900 or 1000. The recharge may occur without the need for a human to manually connect the adaptor to the power source. In an embodiment, drive mechanism 706 may push or tow and/or otherwise facilitate another depowered drive mechanism (not shown) to engage a power source for a recharge.

Figure 8:
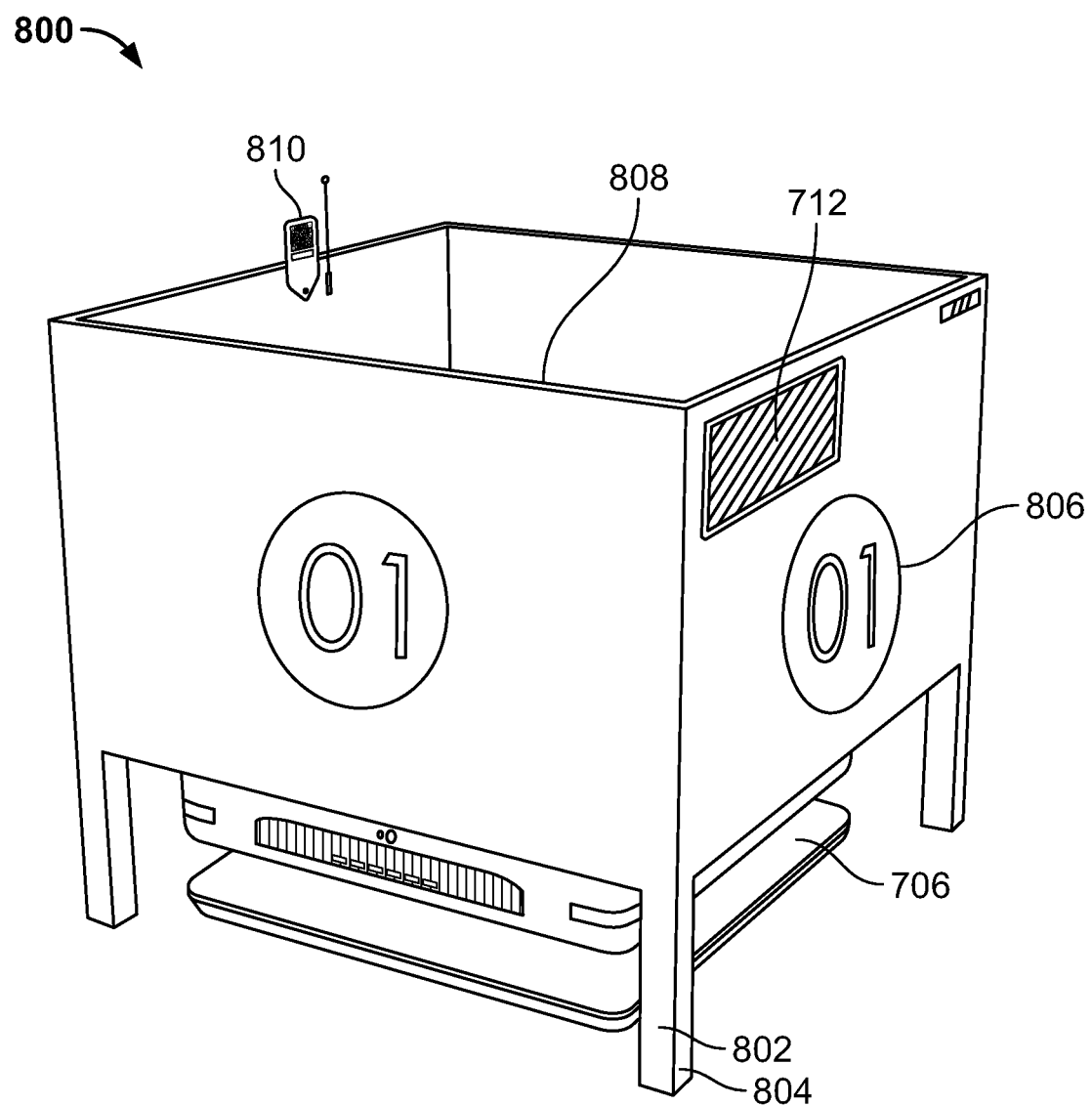
FIG. 8 shows an illustrative perspective view illustration of a first MC.
Figure 9:
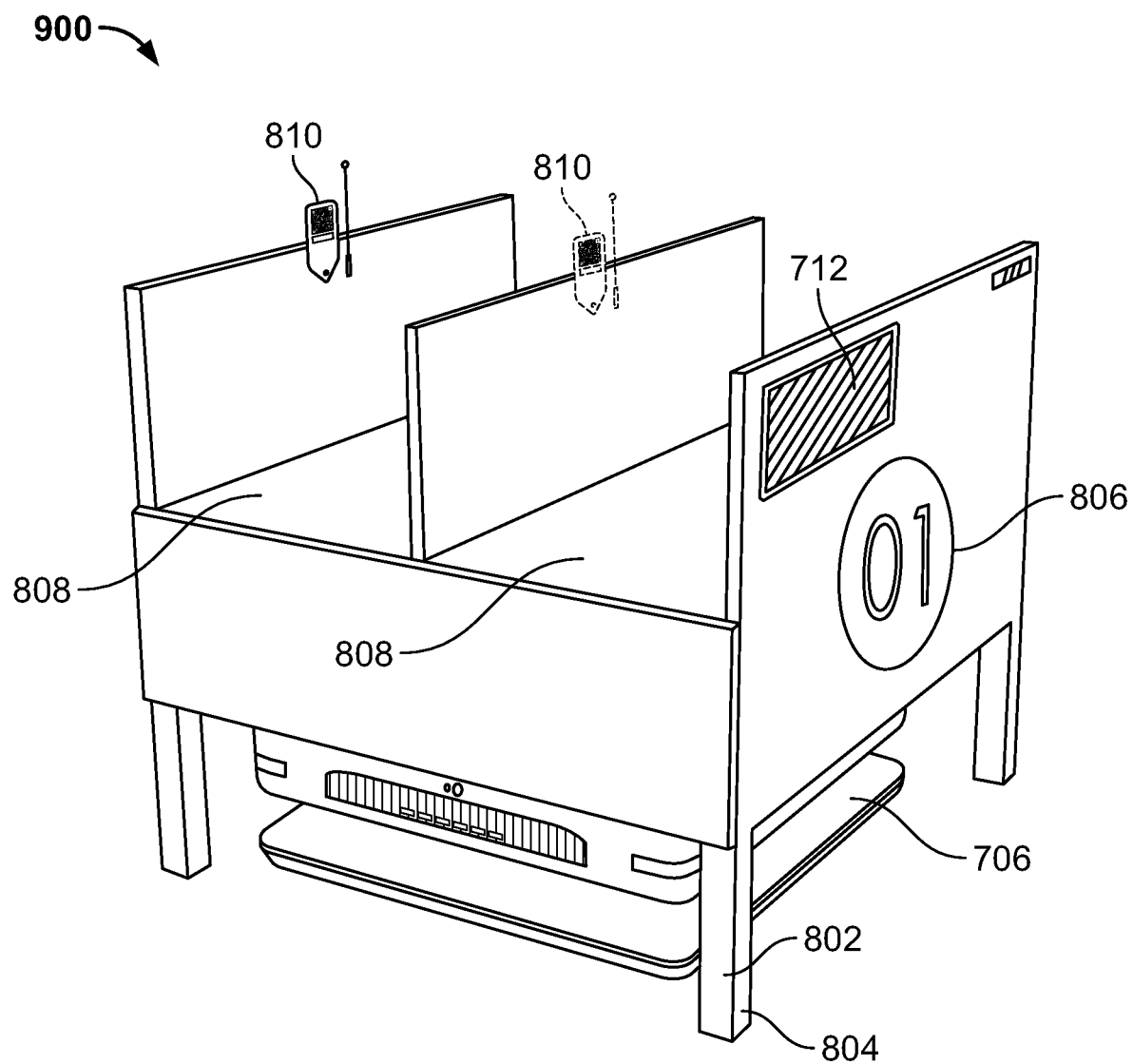
FIG. 9 shows an illustrative perspective view illustration of a second MC.
Figure 10:
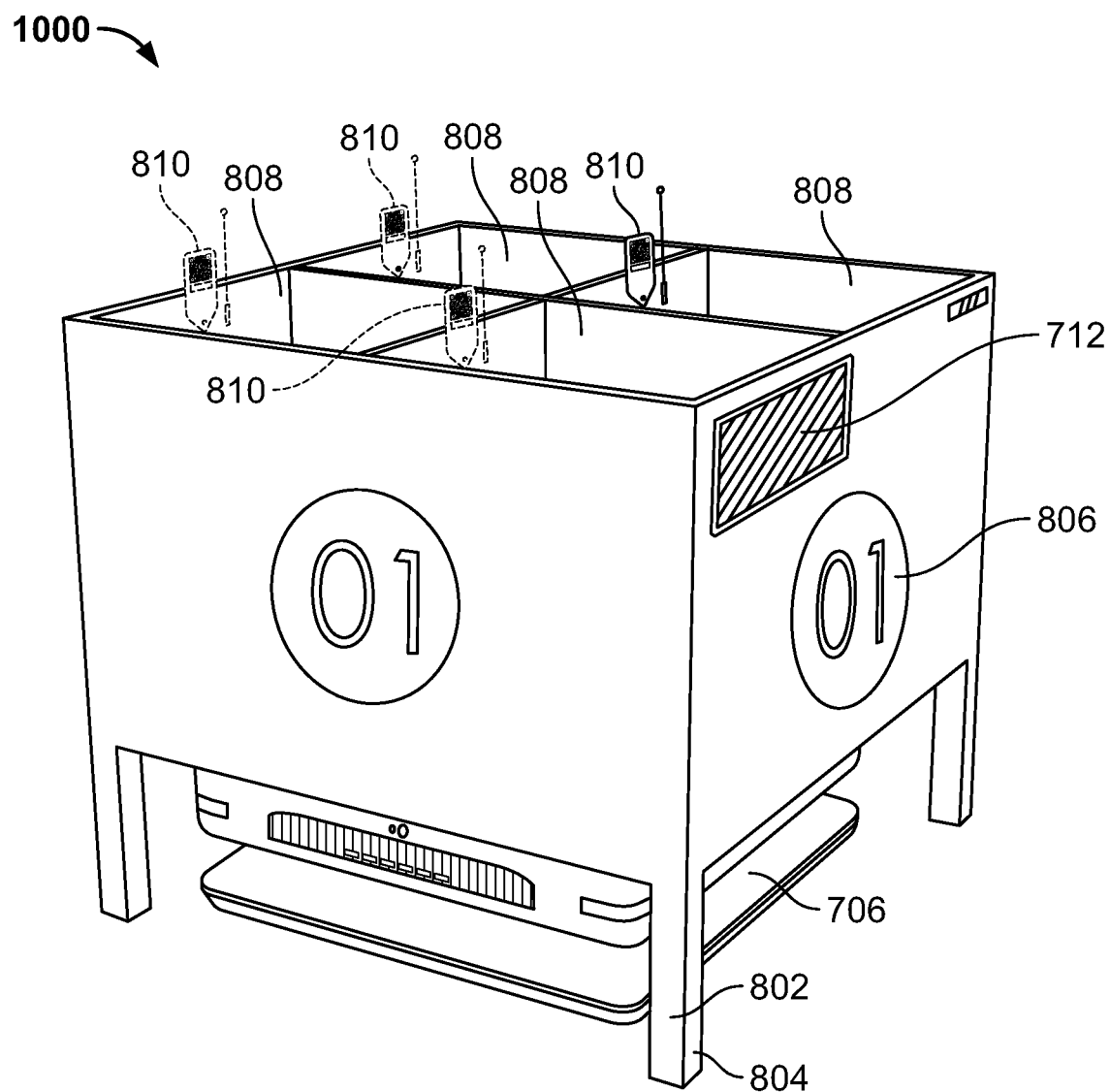
FIG. 10 shows an illustrative perspective view illustration of a third MC.

FIGS. 8, 9, and 10 illustrate examples of mobile containers that may be used with the invention. Mobile containers 800, 900 and 1000 may include storage basins 808. Mobile container 800 may include one storage basin for storage of materials. Mobile container 900 may include two storage basins for storage of materials. Mobile container 1000 may include four basins for storage of materials. It should be appreciated that more or fewer storage basins of materials may be included in the scope of this disclosure. Each basin may also include one or more location-determining devices shown at 810, included in MCs 800, 900 and 1000. Optional location-determining devices are shown in dotted lines. These location-determining devices may also be used to maintain a count of how much inventory remains within a basin versus how much has passed onto a machine tool.

Alternatively, MEs and MCs, included in facility 200, may use location-determining devices to maintain calculations of relative distances from other MEs and MCs, and use that information to efficient plot rendezvous, and minimize collision, within the facility. MCs 800, 900 and 1000 may include workscreen 712. Workscreen 712 or other data delivery device may provide a human operator with specific instructions regarding loading, unloading, or handling of any specific material for any process of any given order.

MCs 800, 900 and 1000 may include reference tag 806. Reference tag 806 may include identifying information relating to the MC.

Figure 11:
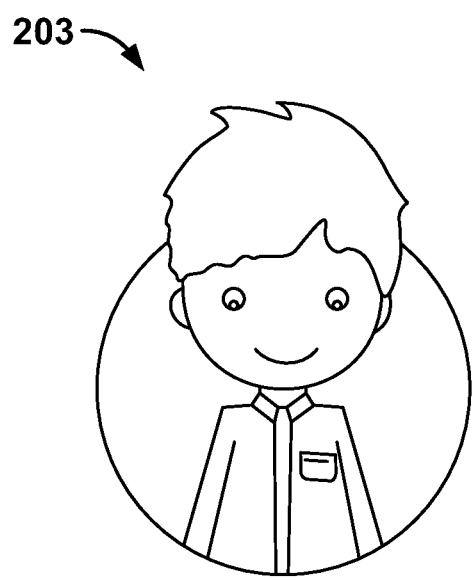
FIG. 11 shows an illustrative first overhead illustration of a workstation for operating an ME with an MC.

FIGS. 11-20 provide an illustrative sequence of illustrative snapshots of activity that may occur at workstation 203. In FIG. 11 a human operator arrives at a workstation 203.

Figure 12:
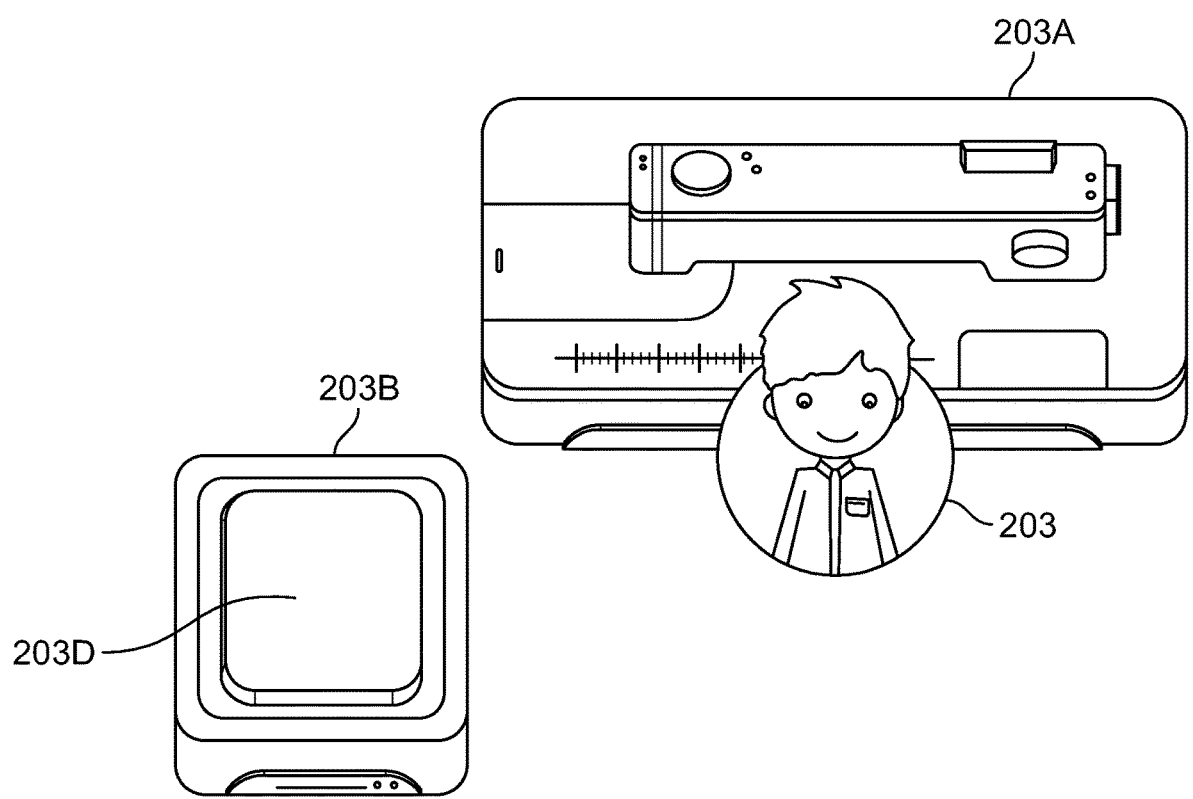
FIG. 12 shows an illustrative second overhead illustration of a workstation for operating an ME with an MC.

In FIG. 12, ME 203A and MC 203B containing material 203D arrive at the workstation 203. Material 203D may be raw material. Material 203D may be WIP material.

Figure 13:
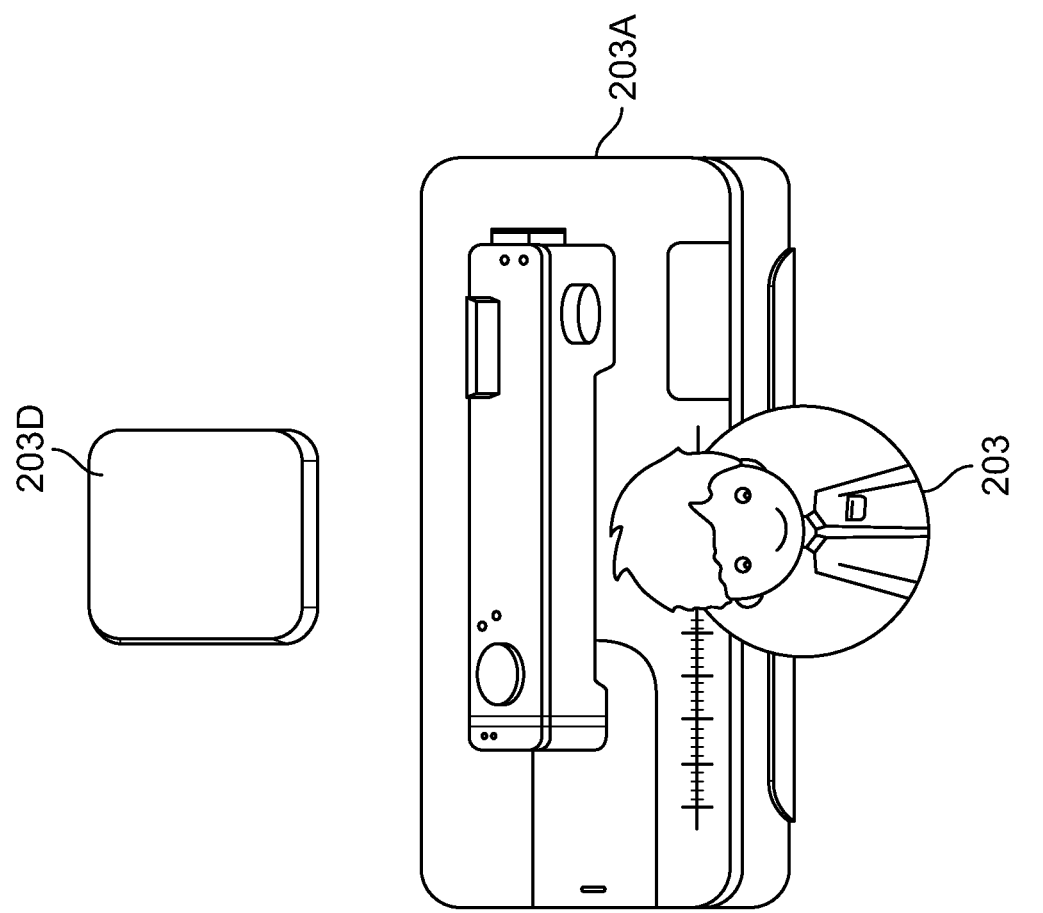
FIG. 13 shows an illustrative third overhead illustration of a workstation for operating an ME with an MC.

In FIG. 13, the Material 203D may be loaded onto ME 203A. Material 203D may be operated on. Upon completion of the transfer of material from MC 203B onto ME 203A, MC 203B may have completed its current task and be free to move on to another task.

Figure 14:
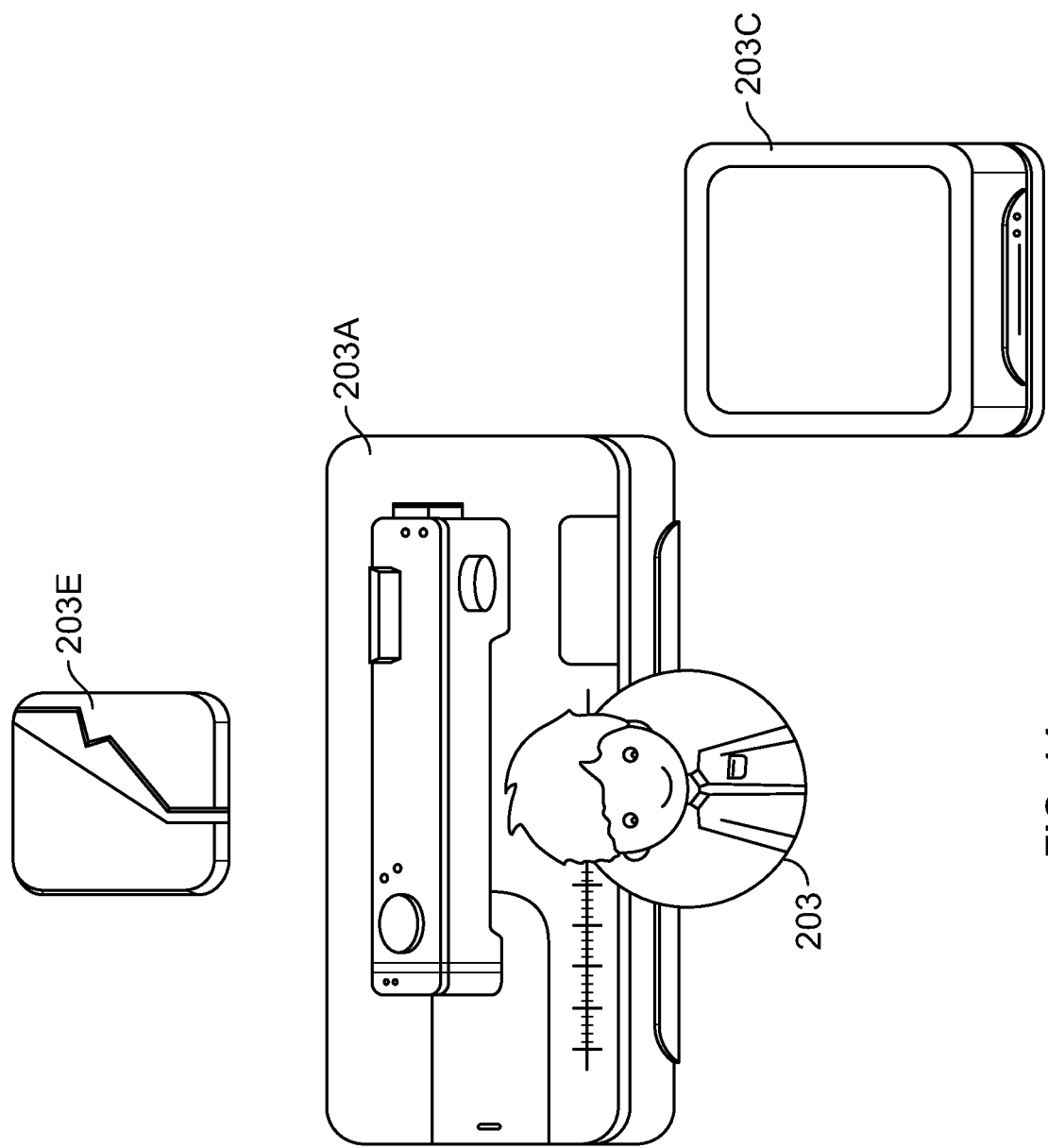
FIG. 14 shows an illustrative fourth overhead illustration of a workstation for operating an ME with an MC.

In FIG. 14, second mobile container 203C may arrive. Second mobile container 203C may arrive before, during, or after ME 203A finishes a process unit on material 203E.

Figure 15:
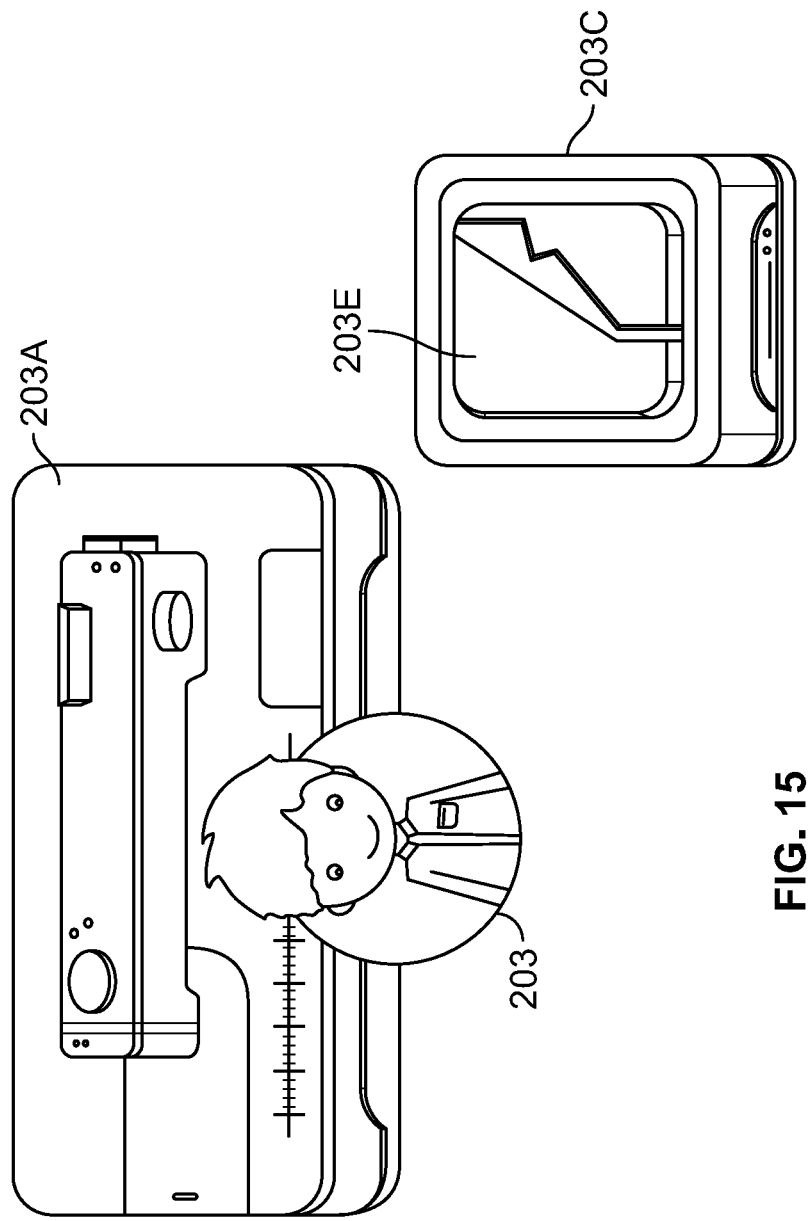
FIG. 15 shows an illustrative fifth overhead illustration of a workstation for operating an ME with an MC.

In FIG. 15, upon completion of material 203E, material 203E may be loaded into the MC 203C.

Figure 16:
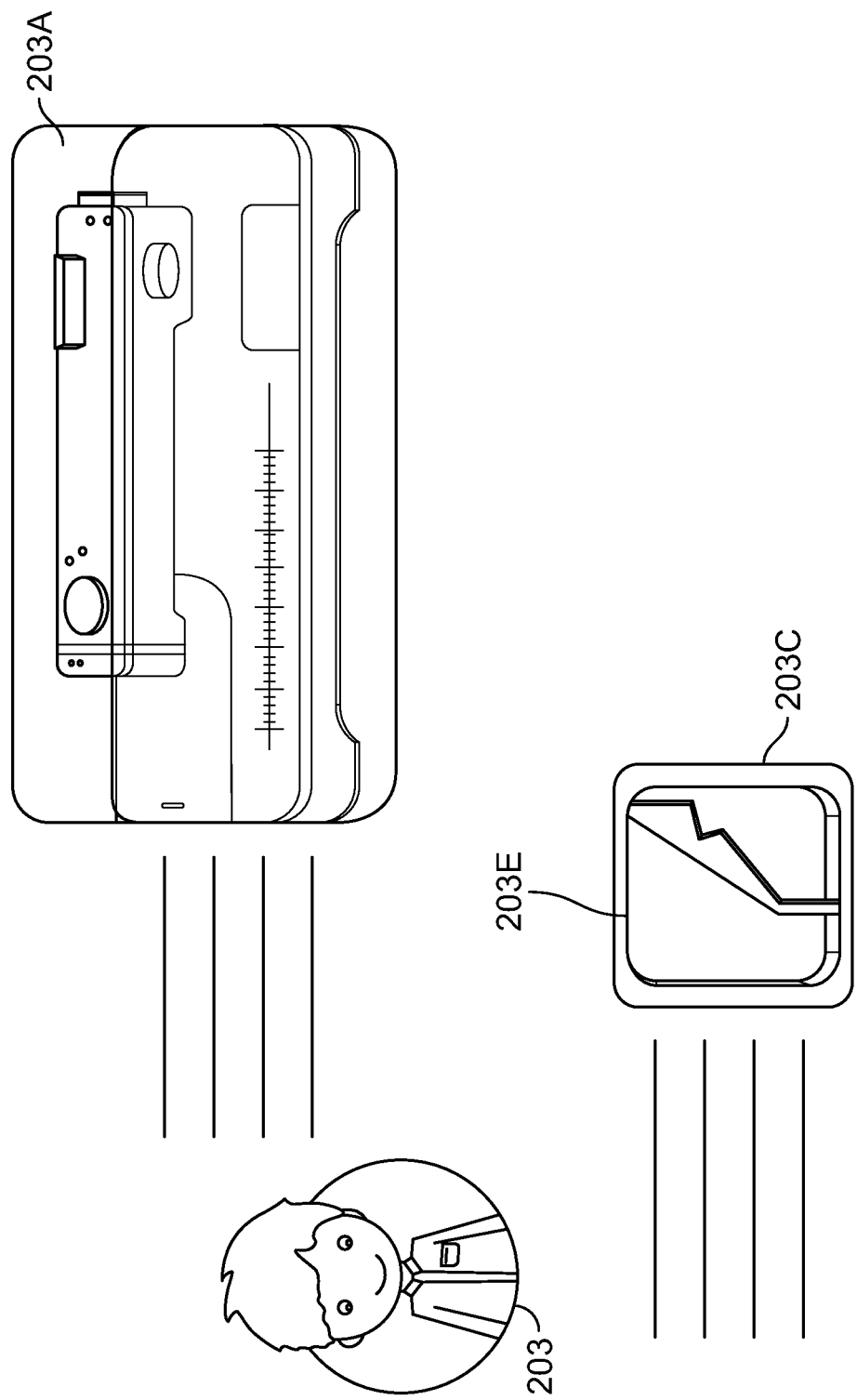
FIG. 16 shows an illustrative sixth overhead illustration of a workstation for operating an ME with an MC.

In FIG. 16, MC 203C and MC 203A are shown leaving workstation 203.

Figure 17:
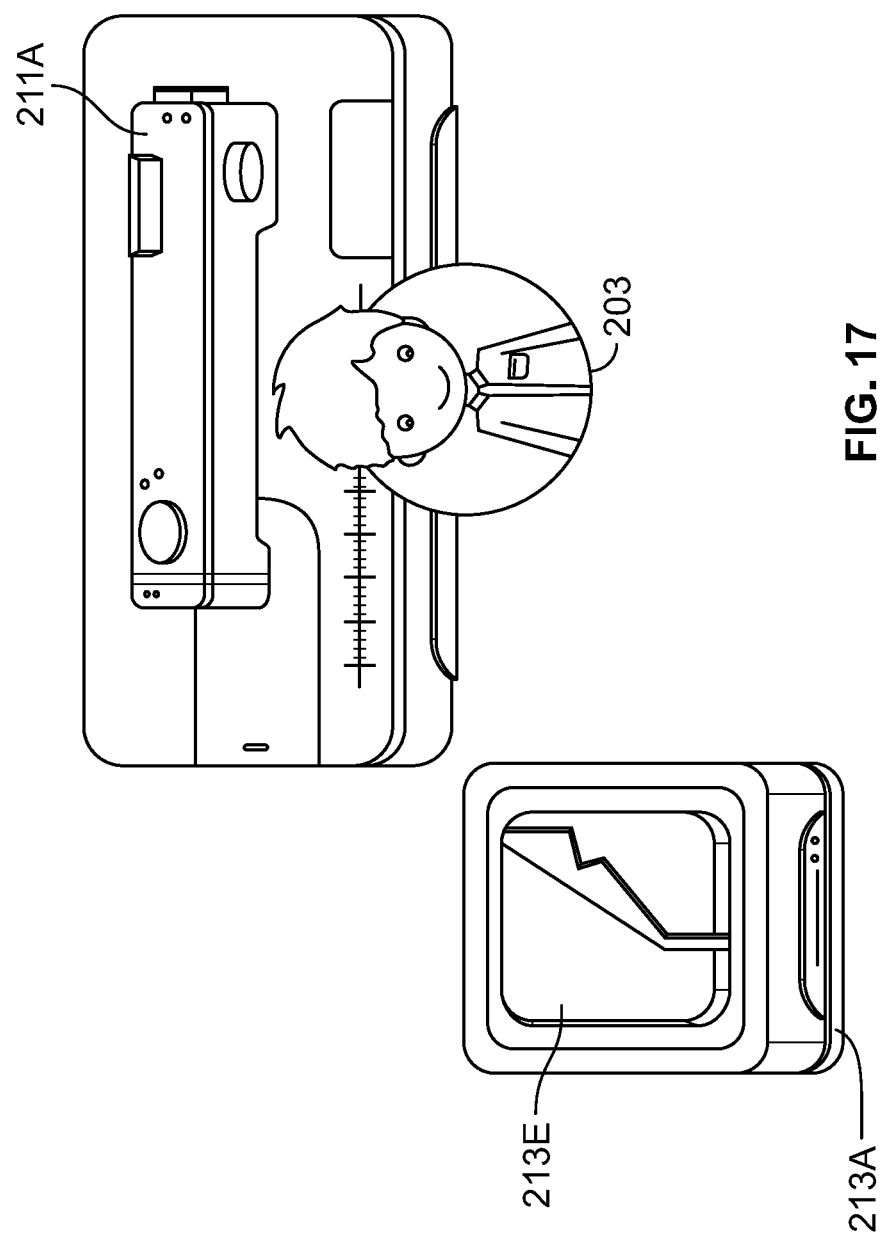
FIG. 17 shows an illustrative seventh overhead illustration of a workstation for operating an ME with an MC.

In FIG. 17, a new MC, MC 213A containing a new WIP, 213E, and a new ME, ME 211A arrive at workstation 203.

Figure 18:
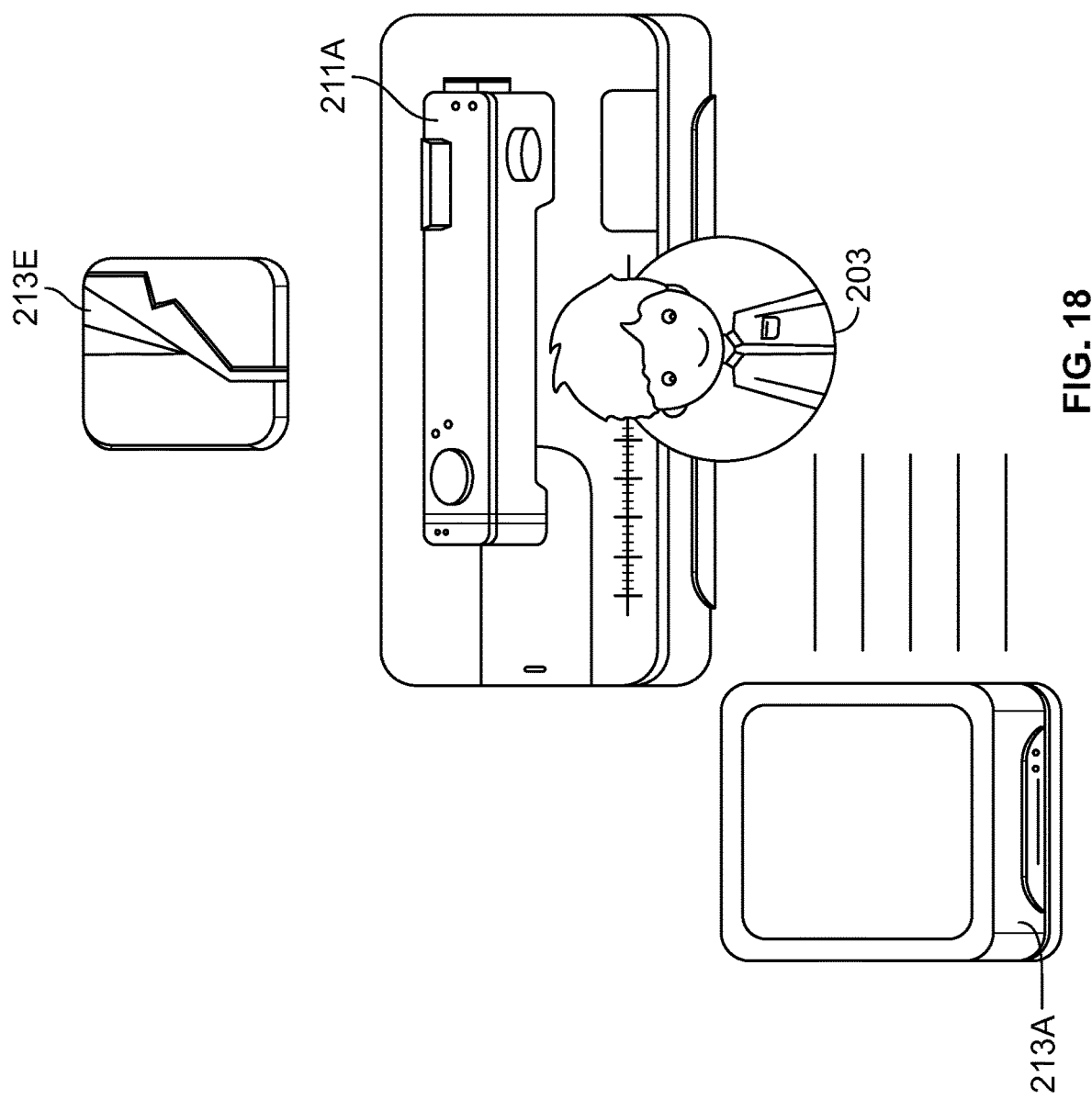
FIG. 18 shows an illustrative eighth overhead illustration of a workstation for operating an ME with an MC.

In FIG. 18, the MC 213A leaves while WIP 213E is being worked on by ME 211A.

Figure 19:
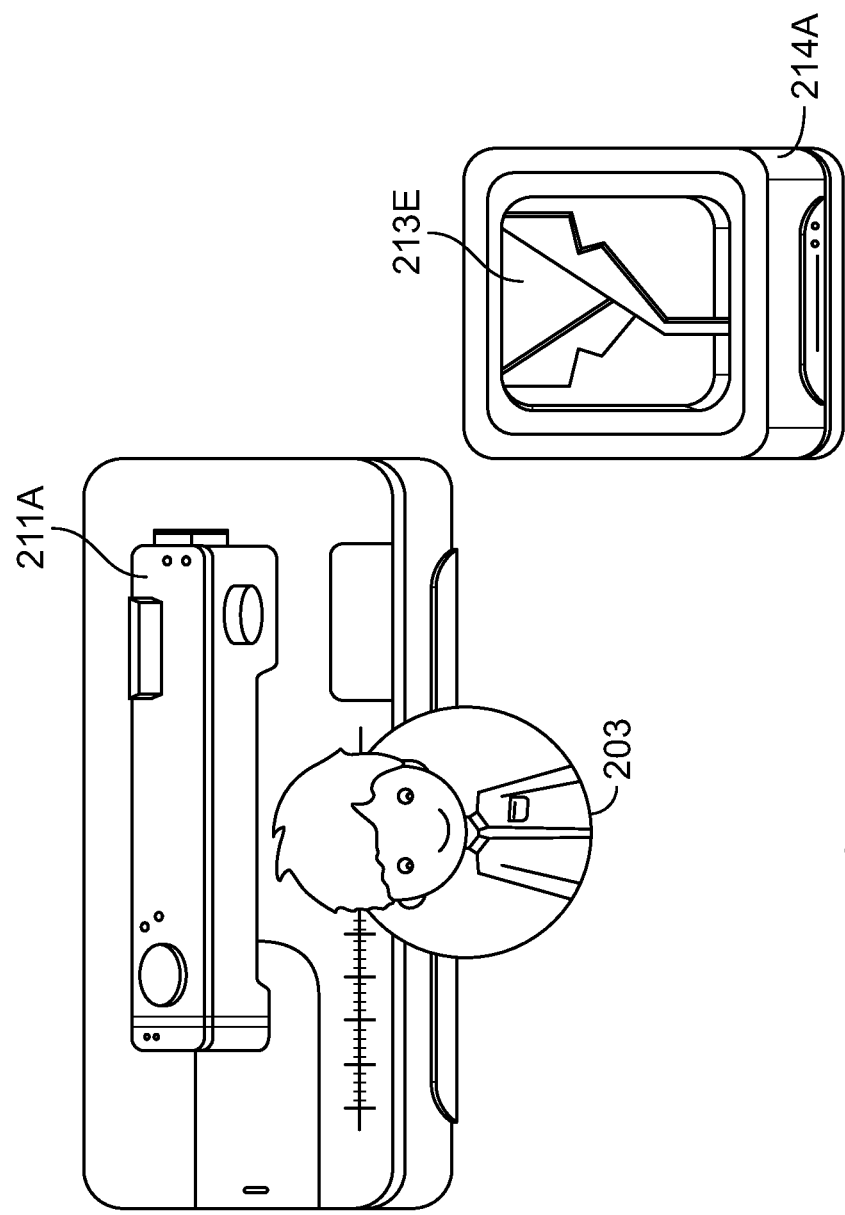
FIG. 19 shows an illustrative ninth overhead illustration of a workstation for operating an ME with an MC.

In FIG. 19, another MC, MC 214A, arrives to take WIP 213E, which is currently a finished product.

Figure 20:
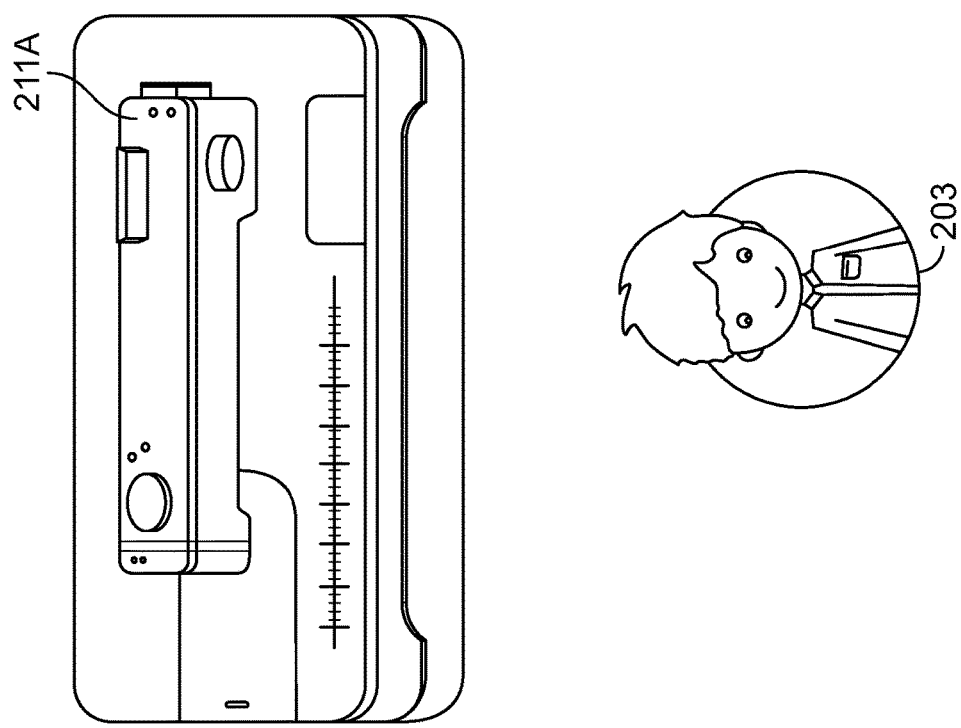
FIG. 20 shows an illustrative tenth overhead illustration of a workstation for operating an ME with an MC.

In FIG. 20, ME 211A leaves workstation 203 because there are no further tasks in the work queue for workstation 203.

When in operation, an ME and/or MC may be positioned within a predetermined distance from a fixed point at the workstation. The distance may range from 1 cm to 9000 cm, or more or less. In an embodiment, the distance is approximately 40% to 200% of the arms' length of a human operator stationed at the workstation.

The dynamic and flexible nature of the system allows for the handling of manufacturing orders in a manner impossible for prior art systems. In a prior art system, when multiple orders for different products come in, the constituent processes of a first order must be completed prior to execution of the constituent processes of a second order. This leads to numerous inefficiencies such as bottlenecks, line imbalances, material delays and maintenance delays. This is well illustrated with the following hypothetical examples.

TABLE 1

Process Specification for End-Product 1—Pant Slacks

| Process # | Process Description | WIP Prerequisites | Machine Needed | Time to Perform (seconds) |
|---|---|---|---|---|
| 1 | Sew Legs | — | Sewing Machine Type 1 | 5 |
| 2 | Cut Zipper Hole | 1 | Cutter Type 1 | 1 |
| 3 | Install Zipper | 1, 2 | Sewing Machine Type 2 | 10 |
| 4 | Sew Belt Loops | 1 | Sewing Machine Type 1 | 3 |

TABLE 2

Process Specification for End-Product 2—Dress Shirt

| Process # | Process Description | WIP Prerequisites | Machine Needed | Time to Perform (seconds) |
|---|---|---|---|---|
| 5 | Sew Torso | — | Sewing Machine Type 1 | 10 |
| 6 | Sew Sleeves | — | Sewing Machine Type 1 | 7 |
| 7 | Connect Torso with Sleeves | 5, 6 | Sewing Machine Type 3 | 15 |
| 8 | Attach Collar | 5 | Sewing Machine Type 4 | 3 |
| 9 | Cut Button Holes | 5, 8 | Cutter Type 1 | 5 |
| 10 | Sew Buttons | 5, 8 | Sewing Machine Type 1 | 4 |

One type of problem solved by the MMS is bottleneck problems. Based on the above, the cumulative time to assemble 1 shirt is 44 seconds, and 1 pair of pants is 19 seconds. In an illustrative example, an order arrives for 10 shirts and 10 pairs of pants. The prior art requires 630 seconds at best to complete the order. Late steps 10 and 4 are delayed by the bottleneck of slow prerequisite early steps 1, 5, and 6. The bottleneck however can be resolved by re-tasking and dispatching the machines and equipment of steps 10 and 4 to first supplement those performing steps 1, 5, and 6 then returning them to perform steps 10 and 4. In an embodiment, the ability to move WIP and equipment around flexibly and as needed may obtain a time savings of potentially 10-35%, or more, or less.

In an embodiment, processes include but are not limited to: moving raw material or a number of parts from a warehouse to a workstation; sorting and/or counting/measuring raw materials and/or the number of parts; dividing a quantity of materials into multiple subunits; combining two or more units into a single unit and placing the single unit into a bin of a tote; placing two or more parts into a multi-bin tote; pre-assembly processes, i.e., formation, steaming, coating, cutting, painting, coloring, surfacing, embroidering; post-assembly processes, i.e., steaming, folding, labeling, bagging, cleaning, testing, resurfacing; assembly processes, i.e., sewing, gluing, bonding, binding, welding, inserting, soldering, and any combination thereof.

Another problem resolved by the MMS is line balancing. When parallel lines of manufacture are operating, it may be desirable that all of the manufacture lines maintain roughly similar rates of production. Maintaining similar rates of production amongst a plurality of manufacture lines may avoid supply surges or shortages. With the production process according to the embodiments, the mobile materials and the mobile equipment can be utilized to change the speed of a specific manufacture line in order to produce a desired line balancing production rate.

Another problem resolved by the MMS is recovery of wasted time. In many prior art facilities, workers spend significant time traveling to or from given workstations or transporting items to or from workstations. By using mobile containers and mobile equipment, the materials and equipment may be transported to the workers at the workstation. Therefore, little to none of the transporting or traveling time is wasted as the completion of one process and the commencement of another are coordinated to be nearly continuous.

Another problem resolved by the MMS is poor worker productivity. It is well known that productivity can be achieved through the use of improved labor quality or improved capital quality (i.e., quality equipment). In an embodiment, the MMS also maintains records of the labor skills or propensities of specific human operators and allocates specific pieces of equipment to remedy the shortcomings of other specific human operators. Thus, if a handicapped human operator requires equipment with easier to handle controls or a near-sighted human operator requires equipment with larger or more visual controls, the MMS can maintain records of those factors and allocate the equipment accordingly. Similarly, if certain human operators are preferred for certain tasks over other human operators, the MMS can allocate or schedule the preferred human operators when the preferred human operators are available. The MMS may use less-ideal human operators when the preferred human operators are unavailable.

Another problem resolved by the MMS is human operator availability. Typically, human operators require breaks during a day of work, and thereby delay an assembly line process during the break. In an embodiment, the MMS calculates when idle times will result due to bottlenecks, load balancing, or other process flow issues, and human operators may schedule their breaks during the scheduled idle times. Such scheduling may minimize production delays caused by human operators' breaks.

Another problem resolved by the MMS is micro-orders. Because the MMS is flexible and allows for the realization and sharing of numerous efficiencies between many different processes, orders having few items or having few numbers of many different items are nevertheless efficient. This makes productive orders from orders that are typically non-productive in a mass production setting. In at least one embodiment, a micro order is an order whose cost is below the combined fixed and variable cost of production. In at least one embodiment, a micro order is an order comprising a quantity of no less than 1 and no more than 1,000,000,000 of at least 1 type of end-product.

Another problem solved is changed orders or inserted rush orders. Typically, when a production process is set up according to a mass production paradigm, fixed equipment and logistics are rigidly oriented to manage the unique requirements of that specific order. This renders such as system poorly equipped to adapt to changes and/or additional orders that require a different configuration of fixed equipment or logistics. In the dynamic system of at least one embodiment, because the equipment and containers are mobile, orders can be changed in mid-production and the containers and equipment are simply re-routed into a matrix preferably optimal for the new order.

The benefits described above allow for different economic models to be used in various industries especially the textile industry. In industries like the textile industry, market demand is often based on the style differentiation of a product. For example, high fashion involves clothing products with a highly differentiated character based on style (esthetic properties which are relative to other textile products). When a product becomes undifferentiated, the market treats it as a commodity and as a result, demand for the product plummets because of the vast quantity of other commodity items already present on the market. It is very difficult however to predict for any given product how many unit sales may occur before the product becomes undifferentiated. The loss in value of a product, once it transitions from differentiated to commodity status, is the single greatest cost associated with many textile (especially high fashion) products.

When this loss in value attaches to unsold product inventory, the phenomenon is known in the industry as risk cost. If there is significant unsold inventory on hand when undifferentiation occurs, risk cost can be very expensive. Economics of scale encourages a producer to mass produce many products but risk cost indicates that at a certain point, mass production becomes counterproductive. The dynamic system however allows for efficient production while avoiding risk cost. This can be achieved by using demand-based methods as opposed to supply-based production. Because the dynamic system can efficiently produce micro orders, small numbers of highly differentiated products can be fed to the market. Because the product is produced via microorders, once product undifferentiation and its associated demand drop occurs, production can be immediately halted and virtually no risk cost attaches to unsold inventory.

Figure 21:
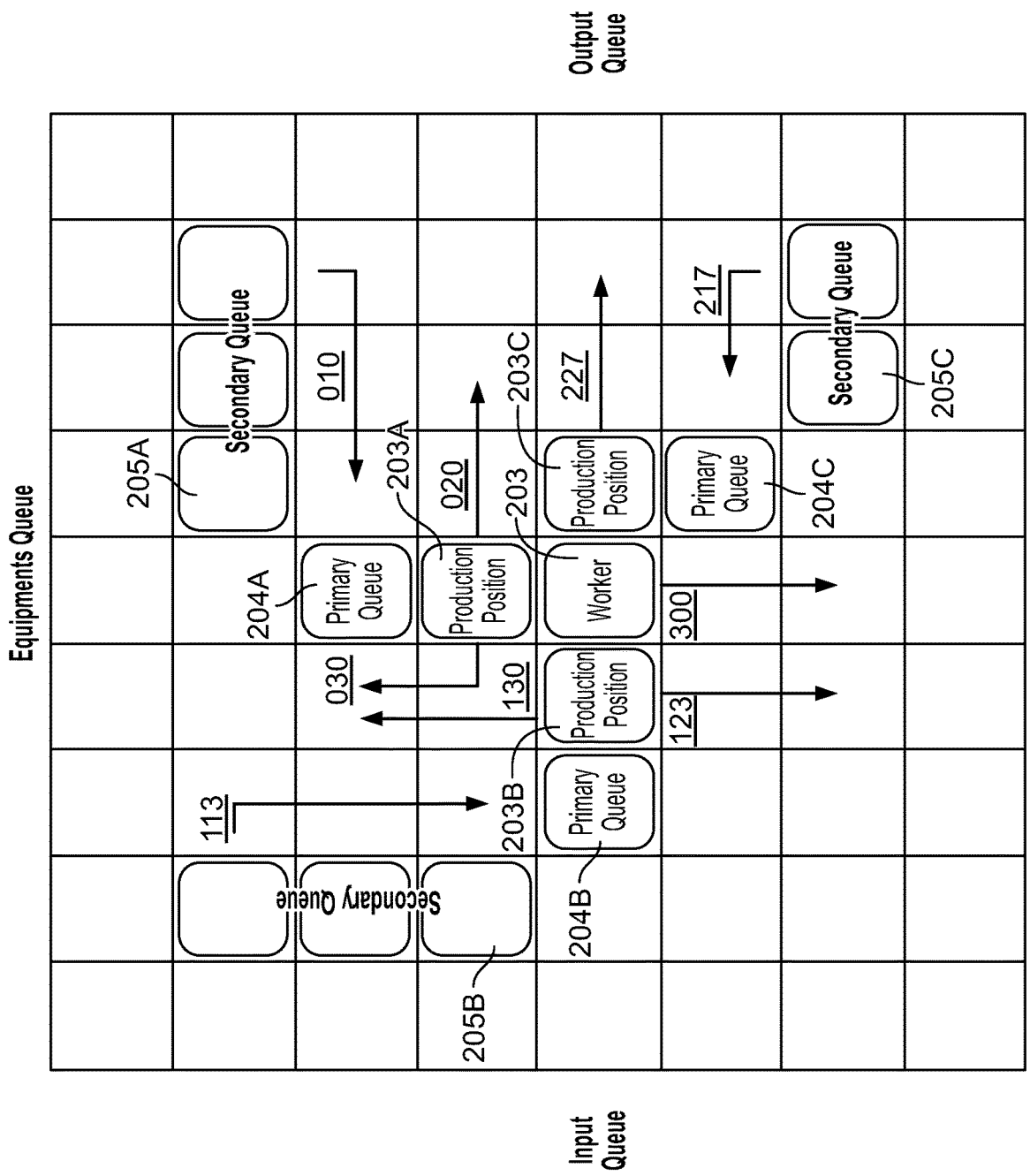
FIG. 21 shows an illustrative overhead illustration of a spread-out ME and MC workstation queue arrangement.
Figure 22:
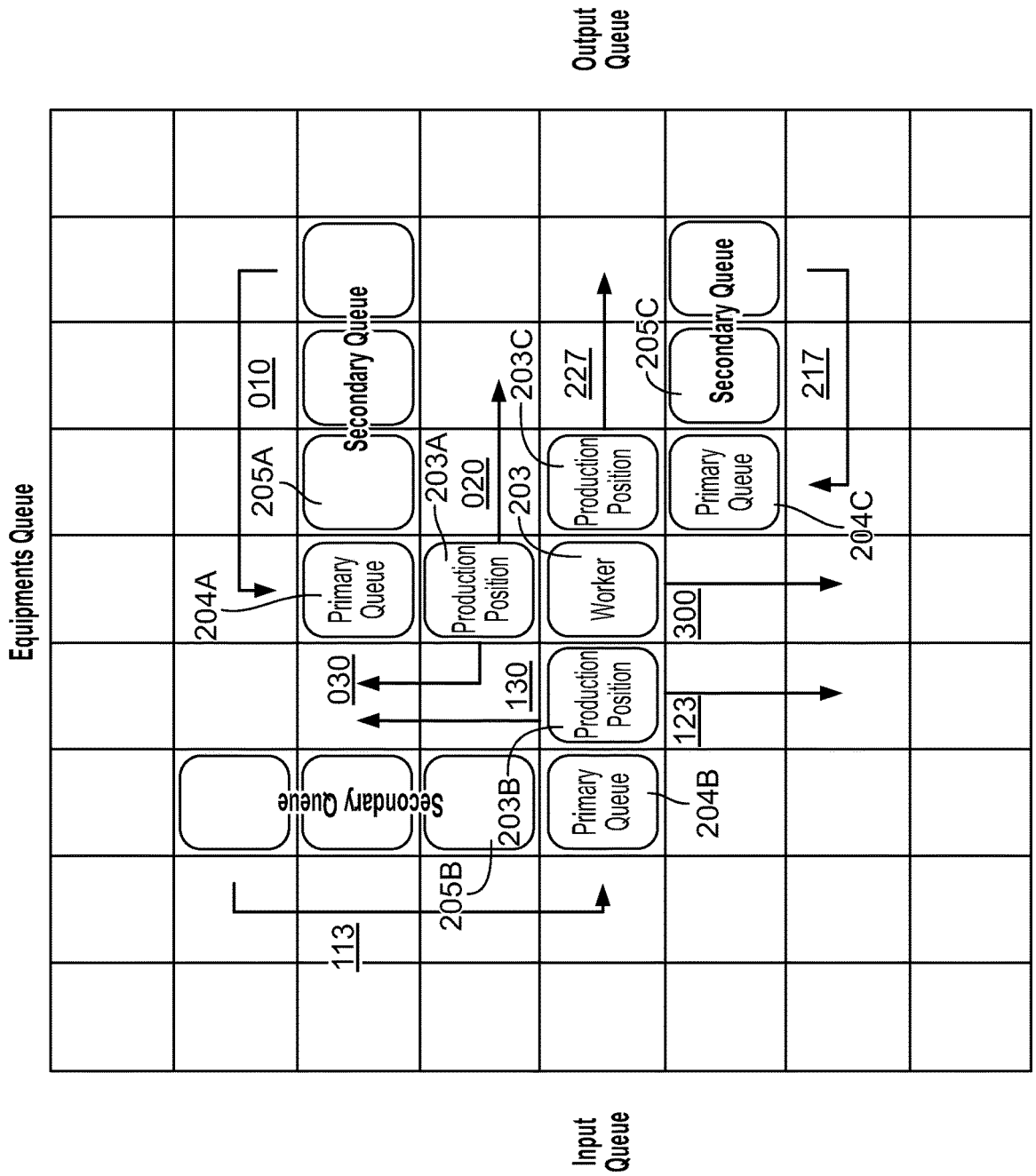
FIG. 22 shows an illustrative overhead illustration of a compressed ME and MC workstation queue arrangement.

FIGS. 21 and 22 illustrate how at a given workstation, mobile containers and/or mobile equipment may be arranged in a queue to perform processes in an efficient and sequential manner. The process makes use of primary queues and secondary queues. ME 203A and MC 203B and MC 203C may be located within a predetermined distance of a given workstation 203. ME 203A may be located in a production position. MC 203B and MC 203C may be also be located in a production position. MC 203B may be an input container. MC 203C may be an output container. Both MC 203B and MC 203C may occupy production positions on opposite sides of the workstation.

At a location immediately adjacent to the production position are primary queues 204A, 204B and 204C. Primary queues 204A, 204B and 204C may include material input primary queue 204B, material output primary queue 204C, and equipment primary queue 204A. At primary queues 204A, 204B and 204C, other mobile containers and mobile equipment are positioned behind those in the primary queues positions. Primary queues 20A, 204B and 204C may be located closest to production positions 203A, 203B and 203C. This may ensure that the least amount of time is lost when transferring MEs or MCs from a queue to a production position.

In some embodiments, only one input MC, output MC, or an ME is in the respective input, output, or equipment primary queue. The one input MC, output MC or ME may be located behind the respective input, output or equipment production position relative to the workstation. Each ME or MC within the production position has at least one exit path which is not blocked by any other mobile equipment or mobile container in any queue. An exit path for a worker by the workstation may also be provided.

The primary queue may be located adjacent to, such as diagonal to in FIG. 21 or orthogonal to in FIG. 22, the one item of a secondary queue, such as 205A, 205B or 205C. One or more mobile containers may be positioned within the secondary queue. The secondary queue may be positioned close enough to the primary queue to transfer mobile equipment or mobile containers into the primary queue when the production position item is leaving and the primary queue item is entering the production position. The secondary queue is positioned far enough away from the production position to allow for changes in which item in the secondary queue moves into the primary queue based on the dynamics of the system. FIG. 21 illustrates a spread-out queue arrangement optimized for flexibility in the sequence of mobile items deployment. FIG. 22 illustrates a compressed arrangement optimized for minimizing floor space footprint in the facility.

Path 010 shows an entry path for an ME to transfer from the secondary queue to the primary queue.

Path 020 shows an exit path for an ME to leave from the production position after completing its designated task.

Path 030 shows an alternative exit path for an ME from the production position after completing its designated task.

Path 113 shows an entry path for an input MC to the primary queue from the secondary queue.

Path 123 shows an exit path for an input MC from the production position after completing its designated process.

Path 217 shows an entry path for an output MC to the primary queue from the secondary queue.

Path 227 shows an exit path for an output MC after the material has been completed and placed within the output MC.

Path 300 shows an exit and/or entry path for a worker or human operator.

Figure 23:
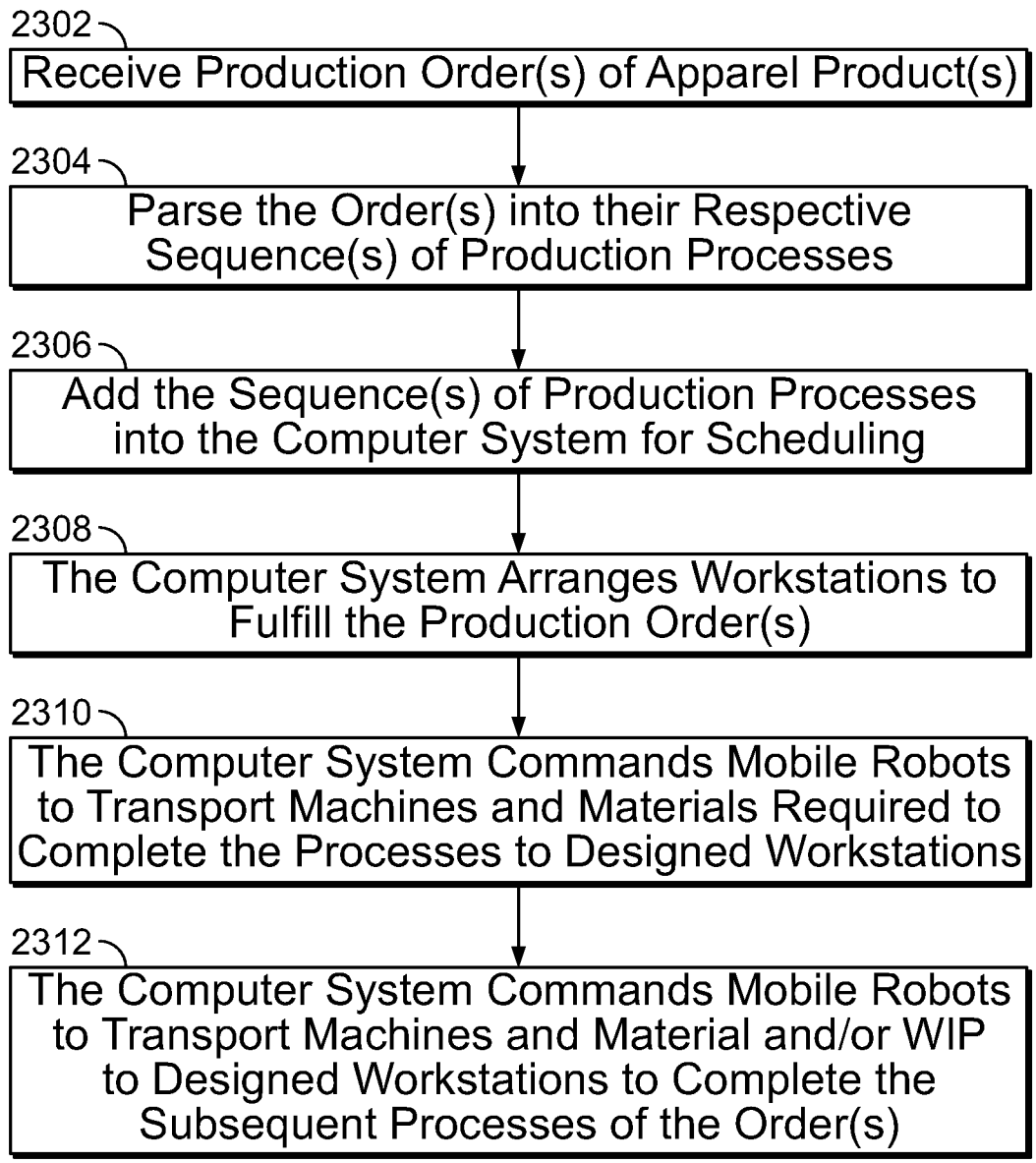
FIG. 23 shows an illustrative flowchart of process logic used by the system.

FIG. 23 shows an MMS using process logic to allocate machines and containers. The process logic may be as follows: A work order for apparel products may be received, as shown at 2302. The work order may include at least one selection and one quantity of at least one defined end-product. The work order may also include a deadline. Production of each end-product may requires the input of specific raw materials and a specific sequence of work processes or process units.

As shown at 2304, the MMS may create a sequential list of work processes that must be completed in order to complete the order.

As shown at 2306, the MMS may add the sequence of production processes into the computer system for scheduling. The MMS may select which of the sequence of work processes should be performed next. This selection may be based on priority schemes, proper time usage, resource preferences, or other criteria and/or resource availability.

As shown at 2308, the MMS may arrange workstations in a facility to fulfill production orders.

As shown at 2310, mobile containers bearing the appropriate input materials, and mobile equipment, are dispatched to a designated workstation. The machine may then perform the process on the input materials.

As shown at 2312, the worked-on material is loaded onto a mobile container and is transported to its next destination. The next destination may be another workstation, storage for WIP or storage/shipping for end products. The MMS may then determine the next process of the sequence of work processes to perform. Steps 2308-2312 may be repeated until all the processes units have been completed.

Each time a new order is received prior to previous orders being completed, the MMS may create a sequential list of work processes that must be completed in order to complete all of the outstanding orders. The process may proceed forward from step 2304.

At times, there may be more machines and resources available than are needed. In such circumstances, the MMS, in parallel for each available machine, may proceed forward from step 2310 until it can no longer allocate work processes to idle machines. the MMS may schedule production tasks in parallel for each available machine.

Representative examples of architectures suitable for an MMS includes any known computer system. The computer system may have a processor for controlling the operation of associated components, and may include RAM, ROM, input/output modules and a memory. The processor may also execute all software running on the computer—e.g., the operating system. Other components commonly used for computers such as EEPROM or Flash memory or any other suitable components may also be part of the computer system.

The memory of the computer system may be comprised of any suitable permanent storage technology—e.g., a hard drive or cloud based storage. The memory stores software, including the operating system of any application(s), along with any data needed for the operation of the computer system. Alternatively, some or all of computer executable instructions may be embodied in hardware or firmware. The computer executes the instructions embodied by the software to perform various functions.

The system may be connected to other computer systems via a local area network (LAN), a wide area network (WAN), or other network arrangement. The system may operate in a networked environment supporting connections to one or more remote computers, such as terminals, personal computers, or servers that include many or all of the elements described above relative to system. The network may be interconnected via adaptors, modems, or other communication medium including the internet.

It will be appreciated that any known network connections or other means of establishing a communications link between the computers may be used. The existence of any of various well-known protocols such as TCP/IP, Ethernet, FTP, HTTP and the like is presumed, and the system can be operated in a client-server configuration to permit a user to retrieve applications such as web pages from a web-based server. Any of various conventional web browsers can be used to display and manipulate data on web pages.

The computer system may also include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; logical processing device, which may compute data structural information, structural parameters of the directed graph and/or language model and machine-readable memory. Components of the computer system may be coupled together by a system bus or other interconnections and may be present on one or more circuit boards. In some embodiments, the components may be integrated into a single chip. The chip may be silicon-based.

Orders may be received by the computer system via manual data entry, or via a Remote Access Device having an informational connection with the computer system. As used herein, the term "Remote Access Device" means any electronic device used to transmit user input and process, store, transmit, and/or output data, and includes but is not limited to, personal computers, business computers, laptop computers, tablet devices, computer networks, software applications, web browsers, SMS devices, SMS software, email devices, email software, electronic data devices, smart phones, flip phones, cell phones, cell phone applications, firmware, websites, cloud-based processing, internet routers, web servers, computer terminals, PDAs, any component thereof, any device integrated with any of the aforementioned, and any combination thereof.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A manufacturing system, the system comprising:
a location;
at least one mobile container;
a first mobile machine; and
a second mobile machine;
wherein:
the system alternates sequentially between a first state, a second state, a third state, and a fourth state;
in the first state, the mobile container and the first mobile machine are within a predetermined distance from the location, the second mobile machine is situated outside of the predetermined distance from the location;

in the second state, the first mobile machine is within the predetermined distance from the location, the mobile container and the second mobile machine are situated outside of the predetermined distance from the location;

in the third state, the first mobile machine and the mobile container are within the predetermined distance from the location, the second mobile machine is situated outside of the predetermined distance from the location; and in the fourth state, the mobile container and the second mobile machine are within the predetermined distance from the location, and the first mobile machine is situated outside of the predetermined distance from the location.

2. The system of claim 1 wherein the location is a fixed position on a floor.

3. The system of claim 1 wherein the location is a position on a floor which varies over time.

4. The system of claim 1 further comprising a floor grid, wherein the floor grid defines a plurality of alternative locations, said alternative locations being located outside of the predetermined distance from the location.

5. The system of claim 1 wherein the mobile machines are assembly line machines.

6. The system of claim 1 wherein the system further comprises process logic, the process logic being configured to manage the mobile container, the first mobile machine and the second mobile machine, the process logic being designed to avoid bottlenecks at either the mobile container, the first mobile machine and/or the second mobile machine.

7. The system of claim 1 further comprising a manufacturing management system, the manufacturing management system being configured to alternate, according to a manufacturing scheme, the system between the states included in the plurality of states.

8. The system of claim 1 wherein, when the mobile container and the first mobile machine are within the predetermined distance from the location, and the mobile container and the first mobile machine are in contact with a floor, the mobile container and the first mobile machine have a higher frictional coefficient with the floor than do a second mobile container and the second mobile machine when the second mobile container and the second mobile machine are in a transition period, said transition period occurring between at least two states, and, therefore, the second mobile container and the second mobile machine are situated outside of the predetermined distance from the location.

* * * * *